United States Patent
Park et al.

(10) Patent No.: US 10,652,839 B2
(45) Date of Patent: May 12, 2020

(54) METHOD FOR CONTROLLING POWER AND ELECTRONIC DEVICE THEREOF

(71) Applicant: Samsung Electronics Co., Ltd., Gyeonggi-do (KR)

(72) Inventors: Yong-Jun Park, Gyeonggi-do (KR); Joo-Han Kim, Gyeonggi-do (KR); Kyoung-Ho Kim, Gyeonggi-do (KR); Joohyun Do, Seoul (KR); Mingoo Kim, Gyeonggi-do (KR); Taelee Lee, Gyeonggi-do (KR); Dong-Il Son, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 16/164,896

(22) Filed: Oct. 19, 2018

(65) Prior Publication Data

US 2019/0124605 A1 Apr. 25, 2019

(51) Int. Cl.
| | | |
|---|---|---|
| *H04W 52/34* | (2009.01) | |
| *H04B 17/10* | (2015.01) | |
| *H04W 52/14* | (2009.01) | |
| *H04W 52/36* | (2009.01) | |

(52) U.S. Cl.
CPC .......... *H04W 52/34* (2013.01); *H04B 17/102* (2015.01); *H04W 52/146* (2013.01); *H04W 52/367* (2013.01)

(58) Field of Classification Search
CPC . H04W 52/34; H04W 52/146; H04W 52/367; H04B 17/102

USPC .................................................. 455/522, 69
See application file for complete search history.

(56) References Cited

U.S. PATENT DOCUMENTS

| | | | |
|---|---|---|---|
| 8,737,934 B2 | 5/2014 | Calvarese et al. | |
| 8,818,294 B2* | 8/2014 | Hochwald | H04B 7/0617 455/115.1 |
| 8,958,840 B2* | 2/2015 | Kim | H04W 52/365 455/522 |

(Continued)

FOREIGN PATENT DOCUMENTS

| | | |
|---|---|---|
| KR | 10-2018-0008232 A | 1/2018 |
| KR | 10-2018-0028801 A | 3/2018 |

OTHER PUBLICATIONS

European Search Report dated Mar. 11, 2019.
European Search Report dated Feb. 14, 2020.

*Primary Examiner* — Hai V Nguyen
(74) *Attorney, Agent, or Firm* — Cha & Reiter, LLC

(57) ABSTRACT

An electronic device includes: an antenna; a communication circuit connected with the antenna; and one or more processors, wherein the one or more processors are configured to: identify a second amount of power corresponding to a second output signal outputted through the antenna for a second time using the communication circuit, the operation of identifying the second amount of power comprising an operation of identifying a second electromagnetic wave absorption rate corresponding to the second amount of power; determine a maximum output power for a third output signal to be outputted through the antenna according to a difference between a target electromagnetic wave absorption rate and the second electromagnetic absorption rate; and output the third output signal through the antenna based at least one the maximum output power.

19 Claims, 14 Drawing Sheets

(56) References Cited

U.S. PATENT DOCUMENTS

| | | | | |
|---|---|---|---|---|
| 8,996,054 B2* | 3/2015 | Kazmi | ............... | H04B 1/3838 |
| | | | | 370/315 |
| 9,107,169 B2* | 8/2015 | Kwun | ............... | H04W 52/16 |
| 9,107,175 B2* | 8/2015 | Kim | ............... | H04W 52/146 |
| 9,468,018 B2* | 10/2016 | Kim | ............... | H04W 52/146 |
| 9,985,677 B2* | 5/2018 | Nishikawa | ............... | H04W 52/38 |
| 10,038,465 B2* | 7/2018 | Park | ............... | H04W 52/283 |
| 10,444,305 B2* | 10/2019 | Tomiha | ............... | G01R 33/3642 |
| 2011/0319123 A1* | 12/2011 | Kwun | ............... | H04W 52/16 |
| | | | | 455/522 |
| 2012/0021800 A1* | 1/2012 | Wilson | ............... | H04W 52/146 |
| | | | | 455/550.1 |
| 2012/0176979 A1* | 7/2012 | Kim | ............... | H04W 52/146 |
| | | | | 370/329 |
| 2012/0214537 A1* | 8/2012 | Kim | ............... | H04W 52/365 |
| | | | | 455/522 |
| 2012/0231784 A1* | 9/2012 | Kazmi | ............... | H04B 1/3838 |
| | | | | 455/423 |
| 2012/0270519 A1* | 10/2012 | Ngai | ............... | H04W 52/226 |
| | | | | 455/404.1 |
| 2012/0270592 A1* | 10/2012 | Ngai | ............... | H04W 52/226 |
| | | | | 455/522 |
| 2013/0252658 A1* | 9/2013 | Wilson | ............... | H04W 52/146 |
| | | | | 455/522 |
| 2013/0310105 A1* | 11/2013 | Sagae | ............... | H04W 52/367 |
| | | | | 455/522 |
| 2014/0171141 A1* | 6/2014 | Niskala | ............... | H04W 52/0248 |
| | | | | 455/522 |
| 2014/0248892 A1* | 9/2014 | Wilson | ............... | H04W 52/146 |
| | | | | 455/452.1 |
| 2015/0126240 A1* | 5/2015 | Suh | ............... | H04W 52/18 |
| | | | | 455/522 |
| 2015/0296464 A1* | 10/2015 | Sagae | ............... | H04W 52/34 |
| | | | | 455/522 |
| 2015/0351122 A1* | 12/2015 | Kim | ............... | H04W 52/146 |
| | | | | 370/329 |
| 2016/0254831 A1* | 9/2016 | Nishikawa | ............... | H04W 52/38 |
| | | | | 455/571 |
| 2017/0064641 A1* | 3/2017 | Logan | ............... | H04W 52/18 |
| 2017/0265148 A1* | 9/2017 | Balasubramanian | ............... | H04W 52/248 |
| 2018/0372814 A1* | 12/2018 | Tomiha | ............... | G01R 33/288 |
| 2019/0215783 A1* | 7/2019 | Chakraborty | ............... | H04W 52/146 |

* cited by examiner

METHOD FOR CONTROLLING POWER AND ELECTRONIC DEVICE THEREOF

CROSS-REFERENCE TO RELATED APPLICATION(S)

This application is based on and claims priority under 35 U.S.C. § 119 to Korean Patent Application No. 10-2017-0136022, filed on Oct. 19, 2017, in the Korean Intellectual Property Office, the disclosure of which is incorporated by reference herein in its entirety.

BACKGROUND

Field

The present disclosure relates to a method for controlling power and an electronic device thereof.

Description of Related Art

An electronic device emits electromagnetic wave signals using an antenna to communicate with other entities. The emitted electromagnetic wave signals may be harmful to human bodies. To solve this problem, an electronic device emitting electromagnetic wave signals measures a specific absorption rate (SAR), which is the rate at which emitted electromagnetic wave signals are absorbed into biological tissue. Various authorized institutions manage a degree of harmfulness to human bodies as standards through the measured SAR. For example, Federal Communications Commission (FCC) in the United States has adopted the specific limit for safe exposure to radio frequency energy at 1.6 W/Kg for cellular telephones. To satisfy the standards, manufacturers should reduce power to such an extent that electromagnetic waves emitted from electronic devices are not harmful to human bodies, or should change a design structure of an emitter (antenna).

As a method for reducing power, time-average power control technology may be applied to an electronic device. When emitted electromagnetic wave signals are managed by using the time-average power control technology, there is inconvenience that average power of an electronic device should be controlled not to exceed a reference by appropriately adjusting power during a time-average calculation period.

In addition, during an uplink data burst, the transmission power can rise considerably, also raising the time-average power. This makes it hard for the time-average power control technology to restore a reference value for limiting output power of an electronic device to an original maximum power limit value until average power is sufficiently reduced. As a result, output is abruptly reduced.

The above information is presented as background information only to assist with an understanding of the present disclosure. No determination has been made, and no assertion is made, as to whether any of the above might be applicable as prior art with regard to the present disclosure.

SUMMARY

Various embodiments of the present disclosure provide an apparatus and a method for enhancing transmission efficiency under a time-average power control condition.

According to various embodiments of the present disclosure, an electronic device includes: an antenna; a communication circuit connected with the antenna; and one or more processors, wherein the one or more processors are configured to: identify a second amount of power corresponding to a second output signal outputted through the antenna for a second time using the communication circuit, the operation of identifying the second amount of power comprising an operation of identifying a second electromagnetic wave absorption rate corresponding to the second amount of power; determine a maximum output power for a third output signal to be outputted through the antenna according to a difference between a target electromagnetic wave absorption rate and the second electromagnetic absorption rate; and output the third output signal through the antenna based at least one the maximum output power.

According to various embodiments, an electronic device includes: a communication module; and one or more processors, and the one or more processors are configured to: identify a first amount of power corresponding to a first output signal outputted from the communication module based on a first maximum power limit value corresponding to an electromagnetic wave absorption rate assigned for a first time, and to identify a first electromagnetic wave absorption rate corresponding to the first amount of power; determine a second maximum power limit value for a second output signal to be outputted through the communication module for a second time after the first time, based on a difference between the electromagnetic wave absorption rate assigned for the first time and the first electromagnetic wave absorption rates and to output the second output signal through the communication module, based at least on the second maximum power limit value.

The apparatus and the method according to various embodiments of the present disclosure, an SAR value is adaptively determined and thus reduction of an output can be minimized.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
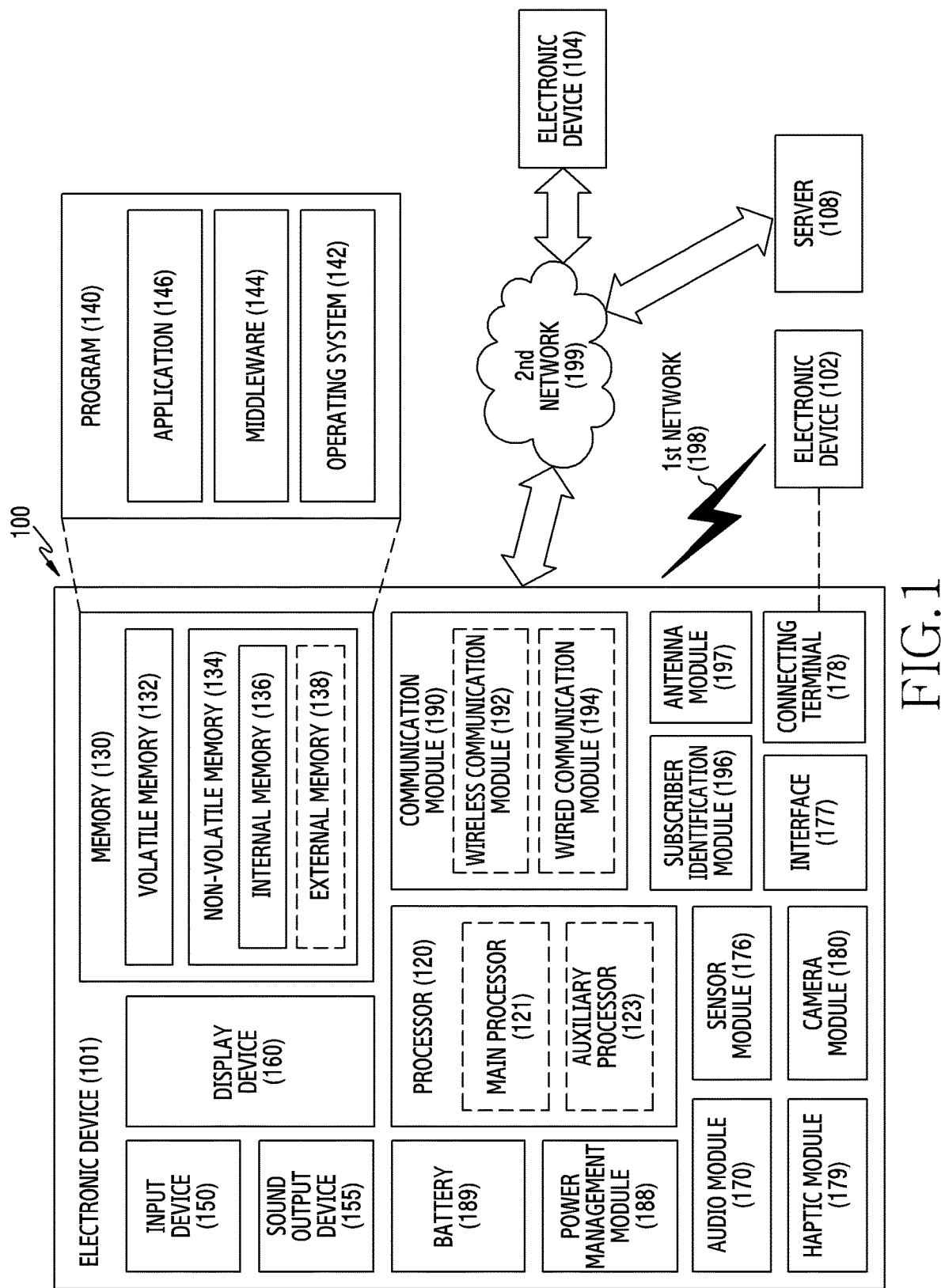
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

In certain embodiments, one or more processors 120 can be configured to control the maximum output power of the antenna module 197.

Figure 2:
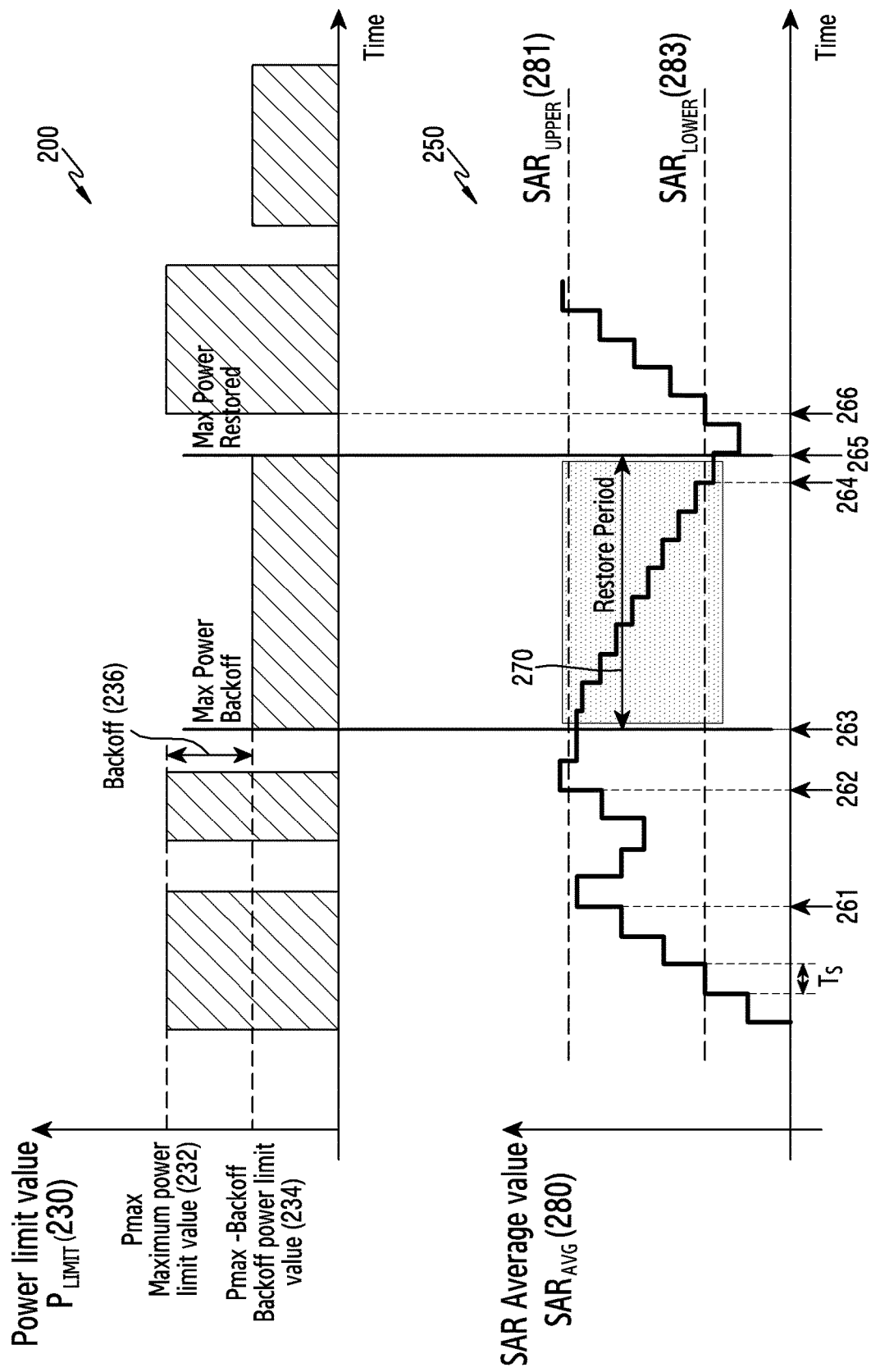
FIG. 2 is a view illustrating a relationship between an SAR average value and a power limit value according to various embodiments.

FIG. 2 is a view illustrating a relationship between an SAR average value and a power limit value according to various embodiments. The top graph shows the power limit value $P_{LIMIT}$ as a function of time, while the bottom graph shows the resulting SAR average $SAR_{AVG}$.

Referring to FIG. 2, a graph 200 shows a change in a power limit value ($P_{LIMIT}$) with time. The horizontal axis of the graph 200 indicates time, and the vertical axis of the graph 200 indicates a power limit value 230. A graph 250 shows a change in an SAR average value ($SAR_{AVG}$) with time. The horizontal axis of the graph 250 indicates time, and the vertical axis of the graph 250 indicates an SAR average value 280.

The electronic device 101 of FIG. 1 may emit electromagnetic waves to communicate with a base station. A part of the electromagnetic waves emitted by the electronic device 101 may be transmitted to the user of the electronic device 101. The rate at which electromagnetic waves are absorbed into biological tissue of the user is referred to as an SAR. At the manufacturing step, the electronic device 101 may be designed to adjust the power limit value 230 so as to make an intensity of emitted electromagnetic wave unharmful to the body of the user. For example, when an SAR value of electromagnetic waves emitted by the electronic device 101 is greater than or equal to a specific threshold, the electronic device 101 may be set to reduce the power limit value 230.

To determine the SAR value of the electromagnetic waves emitted by the electronic device 101, the electronic device 101 may measure power of the electronic device 101 every predetermined time (every first time or second time). The predetermined time may be a minimum time unit for measuring power. The predetermined time may be referred to as an interval unit. The predetermined time may be a time period for measuring power, and may be referred to as an interval period or a sensing cycle. The interval period may have various values according to a communication method of the electronic device 101. For example, when the electronic device 101 supports a long term evolution (LTE) communication system, the interval period may be 1 millisecond (ms) or 200 µs. In another example, when the electronic device 101 supports a $3^{rd}$ generation (3G) system, the interval period may be 447 microseconds (µs). The interval period may be referred to as a micro time.

The electronic device 101 may measure power values in every interval period. The electronic device 101 may determine an average power value for a specific time (interval) (or third time), based on the power values measured in every interval period. The electronic device 101 may add up the power values measured in every interval period for the specific time (or third time), and calculate an average value. In certain embodiments, the average value may be the integral of the power values during the time interval, divided by the time interval. The specific time (or third time) may be referred to as an averaging interval. The specific time may be referred to an averaging time. The specific interval may be referred to as an averaging window. The averaging interval may include the first time and the second time. The averaging interval may correspond to four minutes. The averaging interval may correspond to six minutes. In some embodiments, the electronic device 101 may determine the average power value as the SAR average value 280. In some other embodiments, the electronic device 101 may determine SAR values corresponding to the power values measured in every interval period, and may determine the SAR average value 280 for the averaging interval based on the SAR values.

When the SAR average value 280 is less than or equal to an upper limit value 281 ($SAR_{UPPER}$), the electronic device 101 may set the power limit value 230 to a maximum power limit value ($P_{MAX}$) 232. In certain embodiments, upper limit value 281 ($SAR_{UPPER}$) can be within the local legal maximum SAR, or within a small safety margin. For example, in the United States, the upper limit value 281 ($SAR_{UPPER}$) can be set based on the FCC legal maximum of 1.6 W/Kg, or a safety margin therefrom, such as 1.5 W/Kg. The power limit value 230 may be set by a limit value of power outputted by the electronic device 101. The maximum power limit value 232 may be a maximum power value that can be outputted by the electronic device 101 in the interval period. The power limit value 230 may be changed for time-average power control within the maximum power limit value 232. When the power limit value 230 is changed, the maximum power limit value 232 may be changed or updated to another value from the initial maximum power limit value 232. The changed or updated maximum power limit value corresponds to the change of the power limit value 230, and does not exceed an initial value of the maximum power limit value 232. A maximum SAR limit value may correspond to the maximum power limit value, and may be calculated based on the maximum power limit value. When the power limit value is given, SAR values may be calculated through an arithmetic operation. Alternatively, the power limit value may be calculated based on the SAR values. When a real signal is outputted, the signal may be amplified with reference to the maximum power limit value. However, an arithmetic operation and a control process may be performed with reference to the SAR values to perform time-average power control. The maximum power limit value and the maximum SAR limit value may be interchangeably used.

In an example, the electronic device 101 may transmit at a power limit value of 230. As can be seen, the SAR Average value steadily increases. The electronic device 101 may measure the SAR average value 280 at a first point of time 261. The electronic device 101 may determine that the SAR average value 280 does not exceed the upper limit value 281 at the first point of time 261. The electronic device 101 might not change the power limit value 230. The power limit value 230 may be maintained as the maximum power limit value 232.

When the SAR average value 280 exceeds the upper limit value 281, such as at 262, continuing to maintain the maximum power limit value 232 will result in the SAR Average value 280 exceeding the upper limit 281. To prevent this, and bring the SAR Average value 280 below the upper limit 281, the electronic device 101 may determine the power limit value 230 to a value less than the maximum power limit value 232 by a backoff value 236. The value less than the maximum power limit value 232 by the backoff value 236 may be a backoff power limit value 234 ($P_{MAX}$-Backoff).

The electronic device 101 may determine that the SAR average value 280, at a second point of time 262, exceeds the upper limit value 281. The electronic device 101 may determine to change the power limit value 230. At the next transmission point of time, a third point of time 263, the electronic device 101 may change the power limit value 230 from the maximum power limit value 232 to the backoff power limit value 234. Transmitting at the backoff power limit value 234 brings the SAR Average value 280 down from the upper limit 281, and over time, under the lower limit 283. The lower limit 283 can be an SAR level that is sufficiently low that harmfulness to the human body is no longer at issue.

When the power limit value 230 is set to the backoff power limit value 234, the electronic device 101 might transmit an uplink signal. Specifically, during a period for transmitting the uplink signal (for example, from the third point of time 263 to a fifth point of time 265), the electronic device 101 might transmit the uplink signal with the power limit value 230 being set to the backoff power limit value 234. The period from the third point of time 263 to the fifth point of time 265 may be referred to as a restore period 270. The third point of time 263 may be referred to as a backoff point of time. The restore period 270 may be determined differently according to an amount of hysteresis. The amount of hysteresis may be determined based on the upper limit value 281 and a lower limit value ($SAR_{LOWER}$) 283.

The electronic device 101 may determine SAR values, which correspond to power values measured in every interval period, in the restore period 270. The electronic device 101 may determine the SAR average value 280 for the averaging interval based on the SAR values. When the SAR average value 280 is less than the lower limit value 283, the electronic device 101 may change the power limit value 230. The electronic device 101 may change the power limit value 230 from the backoff power limit value 234 to the maximum power limit value 232. Specifically, the electronic device 101 may determine that the SAR average value 280 is less than the lower limit value 283 at a fourth point of time 264. Thereafter, the electronic device 101 may change the power limit value 230 from the backoff power limit value 234 to the maximum power limit value 232. The electronic device 101 may transmit a signal, based on the power limit value 230 set to the maximum power limit value 232, at a point of time 266 corresponding to the next transmission start point of time.

The electronic device 101 may reduce the power limit value 230 to the backoff power limit value 232, or may maintain the power limit value 230 as the maximum power limit value 232, based on the measured SAR average value 280.

When the power limit value 230 of the electronic device 101 is reduced, a power value outputted by the electronic device 101 is reduced and the electronic device 101 may transmit a signal by low output power. As the electronic device transmits the signal by relatively low output power, the electronic device 101 may obtain a relatively low transmission success rate, and low transmission bit rate. Accordingly, even when the power limit value 230 is reduced, the electronic device 101 may need to restore the power limit value 230 and to transmit the signal by high output power if it is predicted that a power value measured in the next interval period will be sufficiently low and thus the SAR average value 280 to be determined after the averaging interval will be sufficiently less than the lower limit value 283, or may need to restore the power limit value 230 and to transmit the signal by high output power adaptively according to a type of data.

When the restore period 270 extends, the signal transmission success rate may be reduced according to the low power limit value 230. Accordingly, even during the restore period 270, the electronic device 101 may need to restore the power limit value regarding data which uses less power or data of high importance, such as a voice over LTE (Volte) voice signal, and to transmit the signal by high output power.

Figure 3:
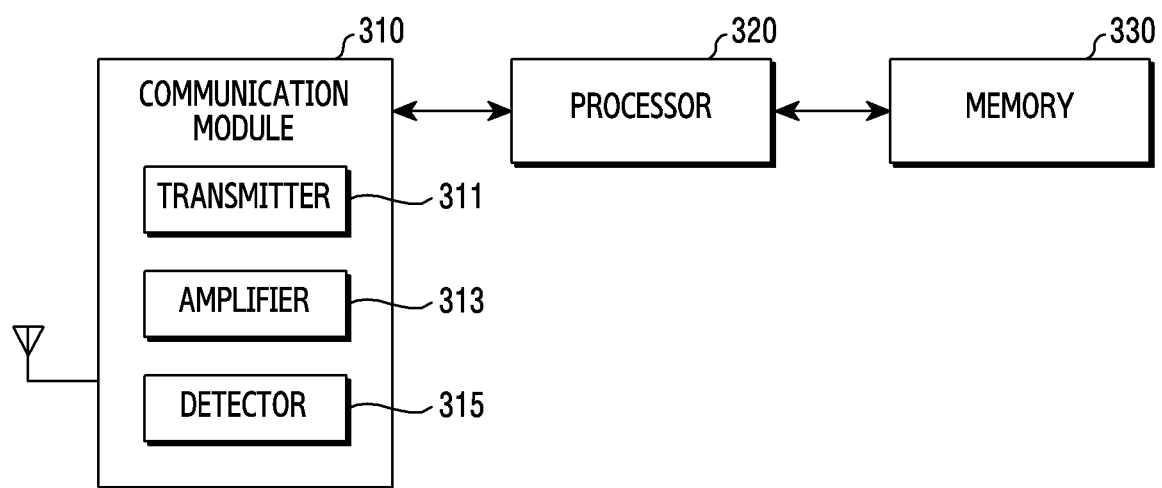
FIG. 3 is a view illustrating an example of a configuration of an electronic device according to various embodiments.

FIG. 3 is a view illustrating an example of a configuration of an electronic device according to various embodiments. The term "unit" or terms ending with suffixes "-er," and "-or" used in the following description refer to a unit processing at least one function or operation, and may be implemented by hardware, software, or a combination of hardware and software.

In various embodiments, the electronic device 101 may be a portable electronic device or may be one of a smartphone, a portable terminal, a mobile phone, a mobile pad, a media player, a tablet computer, a handheld computer, or a personal digital assistant. In addition, the electronic device may be a device combining two or more functions of the aforementioned devices.

Referring to FIG. 3, the electronic device 101 according to various embodiments may include a communication module 310, a processor 320, and a memory 330. The communication module 310, the processor 320, and the memory 330 may be operatively connected with one another.

The communication module 310 (for example, the communication module 190 of FIG. 1) may include circuitry for performing functions of transmitting or receiving a signal via a wireless channel. The circuitry includes a transmitter 311, an amplifier 313, and detector 315. The transmitter 311 can include, for example a modulator that modules a carrier wave according to an information signal, which may include forward error correction, based on a predetermined modulation scheme (such as Amplitude Modulation, Frequency Modulation, or Phase Modulation).

The communication module 310 may up-convert a baseband signal into a radio frequency (RF) band signal, and may transmit the signal via an antenna. The communication module 310 may down-convert an RF band signal received via the antenna into a baseband signal. For example, the communication module 310 may include a transmitter 311, an amplifier 313, and a detector 315. The communication module 310 may transmit transmission power detected at a circuit of the detector 315 to the processor 320 (for example, the processor 120 of FIG. 1). The transmission power measured at the detector 315 may be indicated in the unit of dB, for example, but the size unit of the measured power is not limited thereto. In certain embodiments, the detector 315 may include an ammeter or a voltmeter.

The communication module 310 may obtain a power limit value from the processor 320. The processor 320 may determine the power limit value such that maximum output power of a signal amplified by the amplifier 313 and outputted via the antenna does not exceed the power limit value. In this case, the power limit value may be referred to as a maximum power limit value. The maximum power limit value does not exceed an initially set maximum power limit value. Accordingly, the processor 320 may transmit the determined power limit value to the communication module 310, and may control the communication module 310 based on the transmitted power limit value, such that the maximum output power of a signal outputted from the amplifier through the antenna does not exceed the power limit value.

The communication module 310 may control the amplifier 313 based on the obtained power limit value (for example, 230 of FIG. 2) to control the maximum output power of the transmitted transmission signal. For example, when the power limit value is the maximum power limit value (for example, 232 of FIG. 2), the communication module 310 may transmit the signal by power which does not exceed the maximum power limit value 232.

The processor 320 may control overall operations of the electronic device 101. The processor 320 may include a communication processor (CP) performing communication-related control. The processor 320 may include an application processor (PA) controlling an application program and an upper layer.

The memory 330 (for example, the memory 130 of FIG. 1) may store the initial maximum power limit value 232 or the maximum SAR limit value corresponding thereto in order to make an intensity of electromagnetic wave emitted by the electronic device 101 unharmful to the body of the user. The memory 330 may store a predetermined SAR table regarding SAR values to be assigned at every point of time or in every interval period within an averaging interval, according to the respective power limit values 230 or the maximum power limit value 232, or the maximum SAR limit value. The memory 330 may store an algorithm for generating SAR values to be assigned at every point of time or in every interval period within the averaging interval according to the respective power limit values 230 or the maximum power limit value 232, or the maximum SAR limit value, or for generating the SAR table. The memory 330 may store a control instruction code or control data for controlling the electronic device 101. The memory 330 may store information regarding power. The information regarding the power may include information regarding at least one of the power limit value 230, the maximum power limit value 232, the backoff power limit value 234, the backoff value 236, the upper limit value 281, and the lower limit value 283, shown in FIG. 2. The SAR table may include pairs OF power values of the electronic device 101 and SAR values corresponding to the power values.

The processor 320 may generate values including the pairs of power values of the electronic device 101 and SAR values corresponding to the power values, based on the algorithm. The processor 320 may generate the SAR table based on the algorithm. The algorithm may be an algorithm having at least one of the maximum power limit value 232 and an amount of power or SAR usage measured by the electronic device 10, and a rest SAR, as an input parameter. A rest SAR is the SAR when the device is not being used by the user.

The processor 320 may obtain a power value of the electronic device 101. The processor 320 may determine the SAR value based on the obtained power value. The processor 320 may determine the SAR value corresponding to the obtained power value by using the determined SAR table. The processor 320 may determine the SAR value based on the SAR table. The processor 320 may determine the SAR value based on the measured amount of power or measured SAR usage.

The processor 320 may calculate an SAR average value (for example, 280 of FIG. 2) based on the determined SAR values. The processor 320 may compare the SAR average value with a threshold such as an upper limit value (for example, 281 of FIG. 2) or a lower limit value (for example, 283 of FIG. 2).

The processor 320 may control power based on the result of comparing the SAR average value and the threshold. The processor 320 may determine backoff of the power based on the result of comparing the SAR average value and the threshold. The processor 320 may determine whether to change the maximum SAR limit value or the maximum power limit value based on the result of comparing the SAR average value and the threshold.

The processor 320 may assign SAR values at every point of time or in every interval period within the averaging interval, based on the maximum SAR limit value, the maximum power limit value 232, or the power limit value 230, and may convert the measured amount of power into SAR usage and may compare an SAR quota and the SAR usage. The processor 320 may compare the SAR usage with the SAR quota, and compare a difference therebetween with a lower limit value and may reset the power limit value.

The processor 320 may set an SAR value to be assigned to an initial interval period within the averaging interval by using the initial maximum power limit value 232. The processor 320 may measure power of a signal really outputted in the initial interval period within the averaging interval, may convert the measured power into a corresponding SAR value, and calculate an SAR value actually used in the corresponding interval period. The actually used SAR value may be referred to SAR usage. The processor 320 may determine an SAR value to be assigned to an interval period after the initial interval period, based on the actually used SAR value. The SAR value assigned may be referred to as an SAR quota. The memory 330 may store data such as a parameter necessary for determining an SAR value to be assigned to the interval period after the initial interval period, or instructions.

Figure 4:
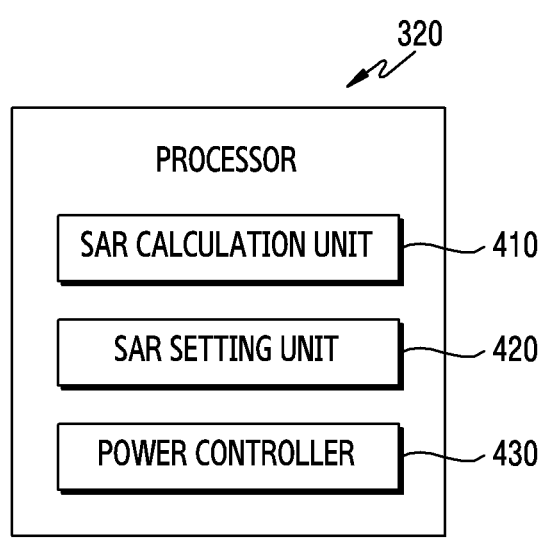
FIG. 4 is a view illustrating an example of a functional configuration of a processor according to various embodiments.

FIG. 4 is a view illustrating an example of a functional configuration of the processor according to various embodiments.

Referring to FIG. 4, the processor 320 may include an SAR calculation unit 410, a SAR setting unit 420, and a power controller 430. The processor 320 may be referred to as a smart time average SAR engine (STASE). In certain embodiments, the processor 320 can be an off-the-shelf processor, programmed with instructions. The SAR calculation unit 410, the SAR setting unit 420, and the power controller 430 can refer to the portions of instructions that calculate the SAR, set the SAR, and control the power, respectively. In other embodiments, the processor 320 can include various ASICs and the SAR calculation unit 410, the SAR setting unit 420, and the power controller 430 can refer to the portions of the ASIC the perform the respective functions.

The SAR calculation unit 410 may obtain a power value of the electronic device 101. The SAR calculation unit may determine the SAR value for one or more interval periods based on the obtained power value. The SAR calculation unit 410 may determine SAR usage corresponding to the power value measured for one or more interval periods. The SAR calculation unit 410 may determine the SAR value corresponding to the obtained power value of the electronic device 101 by using various data or a program stored in the memory 330. The SAR calculation unit 410 may determine the SAR value corresponding to the obtained power value of the electronic device 101 by using the SAR table. The SAR calculation unit 410 may calculate an SAR average value for an averaging interval based on the determined SAR value. The interval period may be a time unit for measuring an amount of power. The interval period may be a time unit for comparing the amount of power. The interval period may have various values according to a communication method of the electronic device 101. For example, when the electronic device 101 supports an LTE communication system, the interval period may be 1 ms or 200 μs.

The SAR setting unit 420 may compare the SAR usage for the interval period and an SAR quota. The SAR setting unit 420 may compare the SAR average value with a threshold such as an upper limit value (e.g., $SAR_{UPPER}$) or a lower limit value (e.g., $SAR_{LOWER}$). The SAR setting unit 420 may determine an SAR value or an SAR quota to be assigned to the next interval period based on the result of comparing.

The SAR setting unit 420 may generate a comparison result by comparing the calculated SAR average value (for example, 280 of FIG. 2) and the threshold. In some embodiments, the SAR setting unit 420 may compare the SAR average value with an upper limit threshold (e.g., $SAR_{UPPER}$) or an upper limit value (for example, the upper limit threshold 281 of FIG. 2). In some other embodiments, the SAR setting unit 420 may compare the SAR average value with a lower limit threshold (e.g., $SAR_{LOWER}$) or lower limit value (for example, the lower limit threshold 283 of FIG. 2). The SAR setting unit 420 may generate the comparison result. The comparison result may indicate one of three conditions. The three conditions may be that (1) the SAR average value 280 exceeds the upper limit threshold 281, (2) that the SAR average value 280 is between the lower limit threshold 283 and the upper limit threshold 281, or (3) that the SAR average value 280 is less than or equal to the lower limit threshold 283. The SAR setting unit 420 may indicate the condition according to the comparison result to the power controller 430.

The SAR setting unit 420 may refine, update, or set the maximum SAR limit value or the SAR quota for the next interval period or the next averaging interval according to the comparison result. The SAR setting unit 420 may refine, update, or set the maximum power limit value for the next interval period or the next averaging interval according to the comparison result. The SAR setting unit 420 may calculate the maximum power limit value or the power limit value corresponding to the maximum SAR limit value or the SAR quota through an arithmetic operation of the SAR calculation unit 410 or the SAR table.

The SAR setting unit 420 may transmit the maximum SAR limit value, the SAR quota, the maximum power limit value, or the power limit value set for the next interval period or the averaging interval to the power controller 430.

The power controller 430 may control power of a signal amplified by the amplifier 313 of the communication module 310 and transmitted via the antenna according to the information received from the SAR setting unit 420. The power controller 430 may control the communication module 310 according to the maximum SAR limit value, the SAR quota, the maximum power limit value, or the power limit value. The power controller 430 may transmit the maximum power limit value or the power limit value to the communication module 310, and may control the communication module 310 to adjust power of the amplified signal of the amplifier 313 of the communication module 310.

The power controller 430 may control power based on the result of comparing the SAR average value 280 and the threshold (for example, the first information, the second information, or the third information). In some embodiments, the power controller 430 may determine whether to perform backoff with respect to a power limit reference value based on the comparison result. The power limit reference value may be the power limit value 230 of FIG. 2. That is, the power controller 430 may determine whether to determine the power limit reference value 230 to the maximum power limit value 232 or to the backoff power limit value 234 less than the maximum power limit value. For example, when the comparison result includes the first information, the power controller 430 may determine whether to perform backoff based on the current power limit value 230. When the current power limit value 230 is the maximum power limit value 232, the power controller 430 may perform backoff to reduce the SAR average value 280.

When the power controller 430 may perform backoff of the power limit reference value 230, the power controller 430 may receive the backoff value 236 from the SAR calculation unit 410 and/or the SAR setting unit 420. The SAR calculation unit 410 and/or the SAR setting unit 420 may individually determine the backoff value 236 according to a power value measured at the detector 315 of FIG. 2.

The power controller 430 may obtain the power limit value 230 from the SAR setting unit 420. The power controller 430 may determine the backoff value 236 and may determine the power limit value 230 according to the backoff value 236. The power limit value 230 may indicate an upper limit value of power used for the electronic device 101 to transmit a signal. The power controller 430 may transmit the determined power limit value 230 to the communication module 310 of FIG. 3.

In the following descriptions of various embodiments according to various drawings, an order of respective operations may be changed, a specific operation may be omitted, two or more different operations may be combined, or operations illustrated in different drawings may be substituted with one other or combined with one another.

Figure 5:
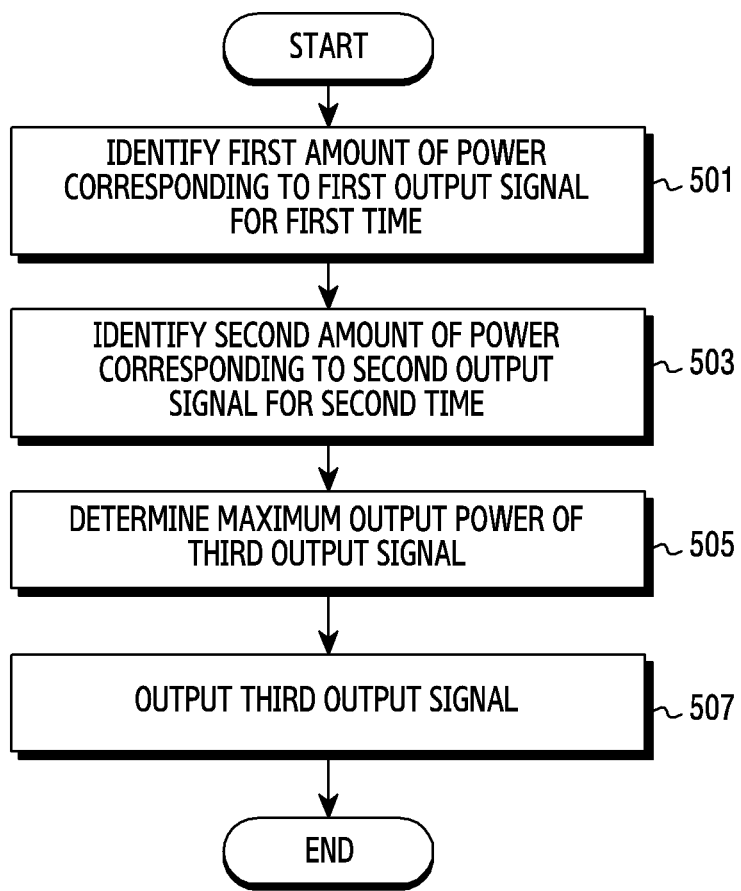
FIG. 5 is a flowchart illustrating an operation of an electronic device according to various embodiments.

FIG. 5 is a flowchart illustrating an operation of an electronic device according to various embodiments. The electronic device may be the electronic device 101 of FIG. 1. The electronic device 101 may include the processor 320 of FIG. 4.

Referring to FIG. 5, in operation 501, the electronic device 101 (for example, the processor 320) may identify a first amount of power corresponding to a first output signal outputted through the antenna (FIG. 1, 197) for a first time, by using a communication circuit (FIG. 1, 190). The operation of identifying the first amount of power may include an operation of identifying a first electromagnetic wave absorption rate corresponding to the first amount of power.

The first time may be an interval period. The first amount of power may be an intensity of power of an amplified signal of the amplifier 313, which is connected with the antenna to amplify a signal outputted from the transmitter 311 in the communication module 310 of the electronic device 101. The first amount of power may be measured by a circuit connected with the transmitter 311 or the amplifier 313 to measure an intensity of signal power, or by the detector 315, such as an ammeter or voltmeter. The processor 320 may identify the first electromagnetic wave absorption rate corresponding to the first amount of power. The electromagnetic wave absorption rate may be referred to as an SAR value. The first electromagnetic wave absorption rate corresponding to the first amount of power may correspond to an SAR value which is used for the first time. The SAR value used for the first time may be referred to as SAR usage for the first time. The first amount of power may be a sum of amounts of power of signals outputted from the antenna of the electronic device 101 for the first time.

In operation 503, the processor 320 may identify a second amount of power corresponding to a second output signal outputted through the antenna for a second time after the first time, by using the communication circuit. The operation of identifying the second amount of power may include an operation of identifying a second electromagnetic wave absorption rate corresponding to the second amount of power.

The processor 320 may identify the second amount of power corresponding to the second output signal outputted through the antenna for the second time after the first time. The processor 320 may repeatedly identify the amount of power in every interval period. For example, the processor 320 may measure the amount of power for the first time corresponding to the interval period (1 ms, 447 μs, 200 ms), and may repeatedly measure the amount of power for the second time corresponding to the next interval period. The processor 320 may identify the second electromagnetic wave absorption rate corresponding to the second amount of power. The second electromagnetic wave absorption rate corresponding to the second amount of power may correspond to an SAR value which is used for the second time. The SAR value used for the second time may be referred to as SAR usage for the second time.

The processor 320 may add up the first amount of power or the SAR usage for the first time, and the second amount of power or the SAR usage for the second time, for a third time including the first time and the second time. The processor 320 may add up the amounts of power measured in every interval period for the third time, thereby calculating a total amount of power. The processor 320 may calculate an SAR value used for the third time, based on the amount of power for the third time. The processor 320 may calculate an SAR average value based on the amount of power for the third time.

In operation 505, the processor 320 may determine maximum output power regarding a third signal to be outputted through the antenna according to a difference between a target electromagnetic absorption rate and the second electromagnetic wave absorption rate. The processor 320 may output the third output signal through the antenna based at least on the maximum output power.

The target electromagnetic wave absorption rate for the second time may be referred to as an SAR value assigned for the second time. The SAR value assigned for the second time may be referred to as am SAR quota for the second time. The processor 320 may determine an SAR quota for the next interval period, based on a difference between the target electromagnetic wave absorption rate or the SAR quota, and the second electromagnetic absorption rate or the SAR usage for the second time. The processor 320 may determine a maximum power limit value or a power limit value corresponding to the SAR quota for the next interval period after the second time. The maximum output power of the third signal to be outputted through the antenna may be determined by the maximum power limit value or the power limit value. The maximum output power of the third signal may be determined to be less than or equal to the maximum power limit value or the power limit value.

In operation 507, the processor 320 may control the communication module 310 based at least on the maximum output power to output the third signal through the antenna. The communication module 310 may set power of a signal to be transmitted according to the maximum output power. The processor 320 may control a signal amplification level of the amplifier 313 of the communication module 310 according to the maximum output power. The processor 320 may control the amplification level of the third output signal outputted through the amplifier 313 of the communication module 310 not to exceed the maximum output power.

Figure 6:
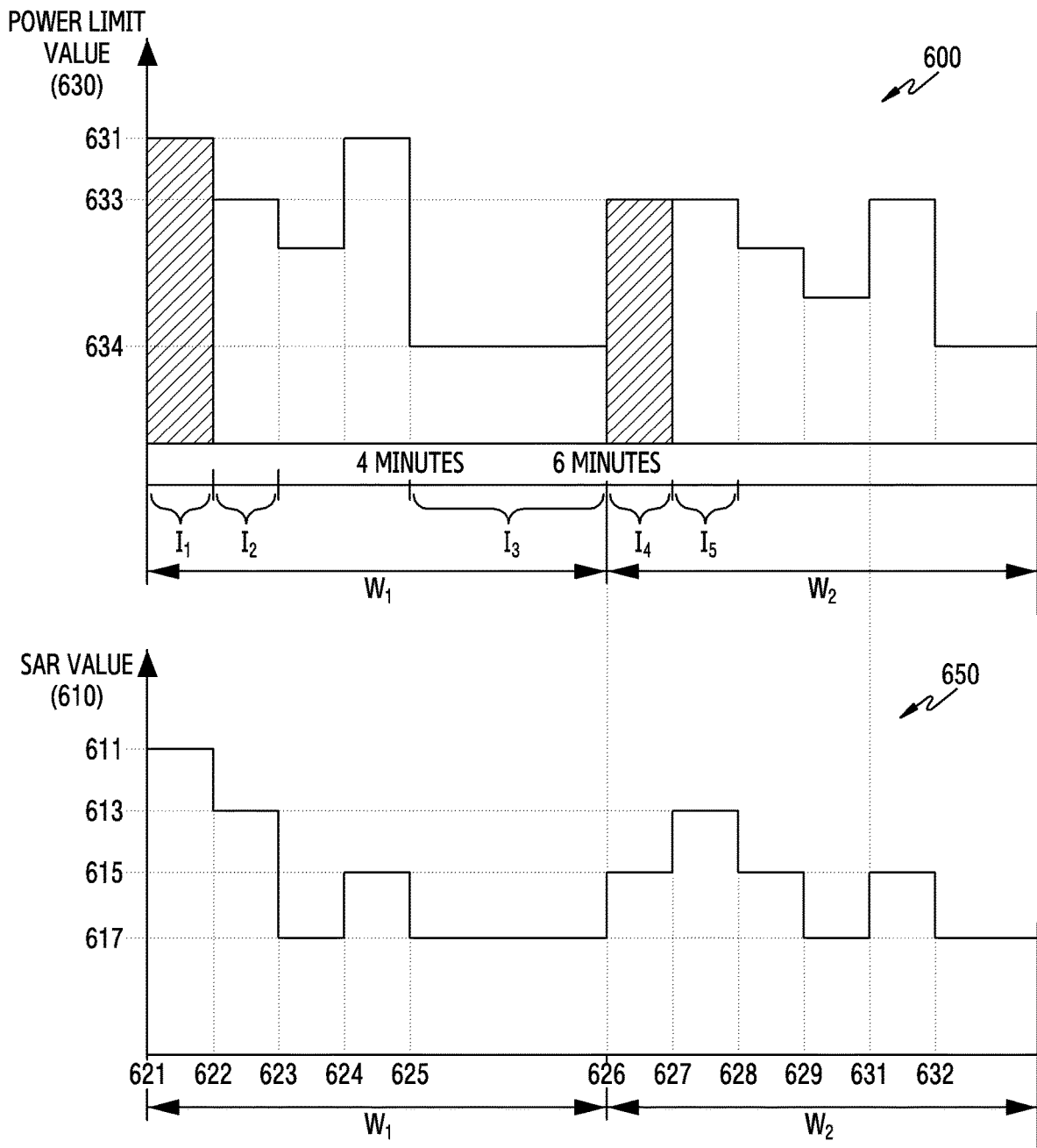
FIG. 6 is a view illustrating an example of transmission power control according to an operation of an electronic device according to various embodiments.

FIG. 6 is a view illustrating an example of transmission power control according to an operation of an electronic device according to various embodiments.

Referring to FIG. 6, an upper graph 600 shows control of transmission power according to an operation of the electronic device 101 according to various embodiments. The horizontal axis of the graph 600 indicates time and the vertical axis of the graph 600 indicates transmission power.

A lower graph 650 of FIG. 6 shows control of transmission power according to an operation of the electronic device 101 according to various embodiments. The horizontal axis of the graph 650 indicates time and the vertical axis of the graph 650 indicates an SAR value. The electronic device 101 (for example, the processor 320) may calculate an amount of power used during each interval period (for example, $I_1$, $I_2$, $I_4$, $I_5$) during an averaging interval (for example, $W_1$ and $W_2$), and may calculate SAR usage corresponding thereto. The vertical axis of the graph 650 indicates an SAR value used in each interval period.

The processor 320 may output a signal based on an initial maximum power limit value 631 at a start point of time 621 of the averaging interval $W_1$. The initial maximum power limit value 631 may be a maximum power value that can be applied by the electronic device 101 according to SAR rules, such as 1.6 W/Kg in the United States. The processor 320 may determine a maximum power limit value for each interval period (for example, $I_1$, $I_2$, $I_4$, $I_5$) during the averaging interval (for example, $W_1$ and $W_2$).

The processor 320 may control maximum output power of a signal outputted through the antenna, based on the power limit value 631 during a specific time (for example, the interval period $I_1$). The processor 320 may identify an amount of power of the interval period $I_1$ at an end point of time 622 of the interval period $I_1$, and may identify SAR usage 611 corresponding thereto. The processor 320 may compare a target electromagnetic wave absorption rate (for example, an SAR quota) corresponding to the maximum power limit value for the corresponding interval period I1, and the SAR usage 611, and may determine a target electromagnetic wave absorption rate (for example, an SAR quota) for the next interval period $I_2$. For example, when the SAR usage 611 is 90% or more of the target electromagnetic wave absorption rate in the interval period $I_1$, the processor 320 may determine a target electromagnetic wave absorption rate or a maximum power limit value for the next interval period $I_2$ by reducing the target electromagnetic wave absorption rate or maximum power limit value from the interval period $I_1$ by a predetermined ratio or amount. When the SAR usage 611 is 90% or more of the target electromagnetic wave absorption rate for the interval period $I_1$, the processor 320 may reduce the target electromagnetic wave absorption rate for the next interval period $I_2$ to 90% of the value at $I_1$. The processor 320 may determine a power limit value 633 which is reduced from the power limit value 631 set for the interval period $I_1$ by a specific amount (for example, 1 dB), as a power limit value for the next interval period $I_2$.

Based on the determined limit value 633, the processor 320 may control a level of an output signal outputted through the antenna from a start point of time 622 to an end point of time 623 of the next interval period $I_1$, and may calculate a used SAR value based on an amount of power used during this period.

When the SAR usage 613 for the interval period $I_2$ is greater than or equal to a specific ratio (for example, 90%) of the target electromagnetic wave absorption rate, the processor 320 may determine a value which is reduced from the power limit value 633 for the interval period $I_2$ by a specific amount (for example, 1 dB), as a power limit value for the next interval period (from a start point of time 623 to an end point of time 624).

Based on the power limit value reduced from the power limit value 633 by the specific amount (for example, 1 dB), the processor 320 may control a level of an output signal to be outputted through the antenna from the start point of time 623 to the end point of time 624 of the next interval period, and may calculate a used SAR value 617 based on an amount of power using during this period.

When a difference between the SAR usage 617 of the interval period (from the start point of time 623 to the end point of time 624), and a target electromagnetic wave absorption rate is greater than or equal to a specific ratio (for example, 90%), the processor 320 may determine a power limit value for the next interval period (from a start point of time 624 to an end point of time 625) to the initial maximum power limit value 631, for example.

Referring to the averaging interval $W_2$, when a difference between a target electromagnetic wave absorption rate for the interval period $I_4$, and SAR usage 615 exceeds a specific ratio (for example, 90%) of the target electromagnetic wave absorption rate, the processor 320 may determine a target electromagnetic wave absorption rate or a maximum power limit value for the next interval period ($I_5$) the same as the target electromagnetic wave absorption rate or the maximum power limit value for the previous interval period ($I_4$). In this case, the target electromagnetic wave absorption rate or the maximum power limit value for the interval period $I_4$ may be determined to a maximum target electromagnetic wave absorption rate or a maximum power limit value that can be determined in the averaging interval $W_2$.

The processor 320 may identify a rest SAR value by subtracting the sum of SAR usage 611, 613, 617, 615 of the interval periods (for example, four interval periods including $I_1$ and $I_2$) from the total SAR value assigned to the corresponding averaging interval $W_1$ at every end point of time (for example, 625) of the interval period.

When the rest SAR value is less than or equal to a lower limit value in the remaining time (for example, $I_3$) of the averaging interval $W_1$, the processor 320 may reset a maximum SAR limit value based on the rest SAR value and the remaining time $I_3$. For example, when the rest SAR value is less than or equal to the lower limit value (for example, 1%), the processor 320 may determine an average value of the rest SAR values as the maximum SAR limit value for the remaining period ($I_3$) of the corresponding averaging interval, based on the rest SAR. Accordingly, a maximum power limit value 634 for the remaining time $I_3$ of the corresponding averaging interval $W_1$ is equally applied for the remaining time $I_3$.

When the time (for example, six minutes) corresponding to the averaging interval $W_1$ elapses, the processor 320 may determine whether the rest SAR value of the corresponding averaging interval is less than or equal to a lower limit value (for example, 5% of the total SAR quota). When the reset SAR value is less than or equal to the lower limit value, the processor 320 may apply the maximum SAR limit value or the maximum power limit value 601 applied to the previous averaging interval $W_1$ to the next averaging interval $W_2$. When the rest SAR value is greater than or equal to the lower limit value, the processor 320 may set a maximum power limit value that can be set for the next averaging interval $W_2$ by the electronic device 101. Even when the SAR value used in the averaging interval indicates that the SAR quota is almost consumed, the processor 320 may apply the SAR quota assigned in the previous averaging interval. In this case, the maximum SAR limit value or the maximum power limit value may be restored to the maximum SAR limit value or the maximum power limit value applied to the previous averaging interval.

On the other hand, when the rest SAR value is greater than or equal to the lower limit value, the processor 320 may apply the initially applied maximum SAR limit value or the maximum power limit value corresponding thereto to the next averaging interval or next interval period. Since there is a margin in the used SAR value compared to the assigned SAR value, a maximum power value that can be applied in the next interval period by the electronic device 101 may be set.

Figure 7:
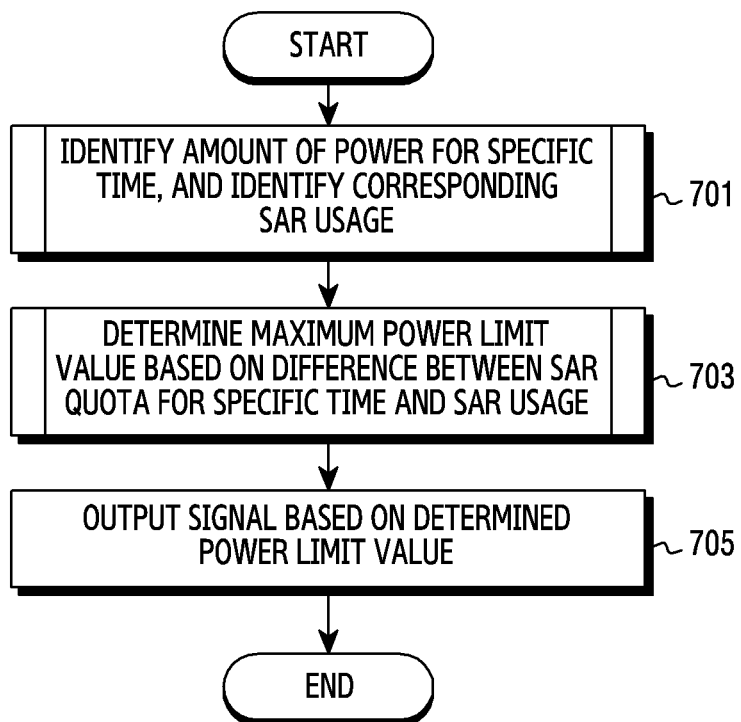
FIG. 7 is a flowchart illustrating an operation of an electronic device according to various embodiments.

FIG. 7 is a flowchart illustrating an operation of an electronic device according to various embodiments. The electronic device may be the electronic device 101 of FIG. 1. The electronic device 101 may include the processor 320 of FIG. 4.

Referring to FIG. 7, in operation 701, the electronic device 101 (for example, the processor 320) may output a signal based on a maximum power limit value, and may identify an amount of power for a specific time and identify SAR usage corresponding thereto. The specific time may be an interval period. The specific time may be 1 ms, 447 µs, 200 µs, or a multiple thereof. For example, calculation may be performed during the interval period (for a first time), and calculation may be performed again during the next interval period (for second time) after the interval period (1 ms, 447 µs, 200 µs). The amount of power may be power of a signal outputted from the antenna of the electronic device 101. The amount of power may be an intensity of power of an amplified signal of the amplifier 313, which is connected with the antenna to amplify a signal outputted from the transmitter 311 in the communication module 310 of the electronic device 101. The amount of power may be measured by a circuit connected with the transmitter 311 or the amplifier 313 to measure an intensity of signal power, or by the detector 315.

In operation 703, the processor 320 may change, update, or reset the maximum power limit value based on a difference between an SAR quota and the SAR usage for the specific time. The SAR quota for the specific time may be determined according to the maximum power limit value. The SAR quota for the specific time may be determined based on an SAR value corresponding to the maximum power limit value. The SAR quota for the specific time may be determined according to an SAR average value set for the specific time. The SAR quota for the specific time may be determined based on the maximum power limit value and an SAR average value for an averaging interval including the specific time.

In operation 705, the processor 320 may control the communication module 310 based on the adjusted power limit value to output a signal transmitted via the antenna. The communication module 310 may set power of the transmitted signal according to the adjusted power limit value. The processor 320 may control a signal amplification level of the amplifier 313 of the communication module 310 according to the adjusted power limit value.

Figure 8:
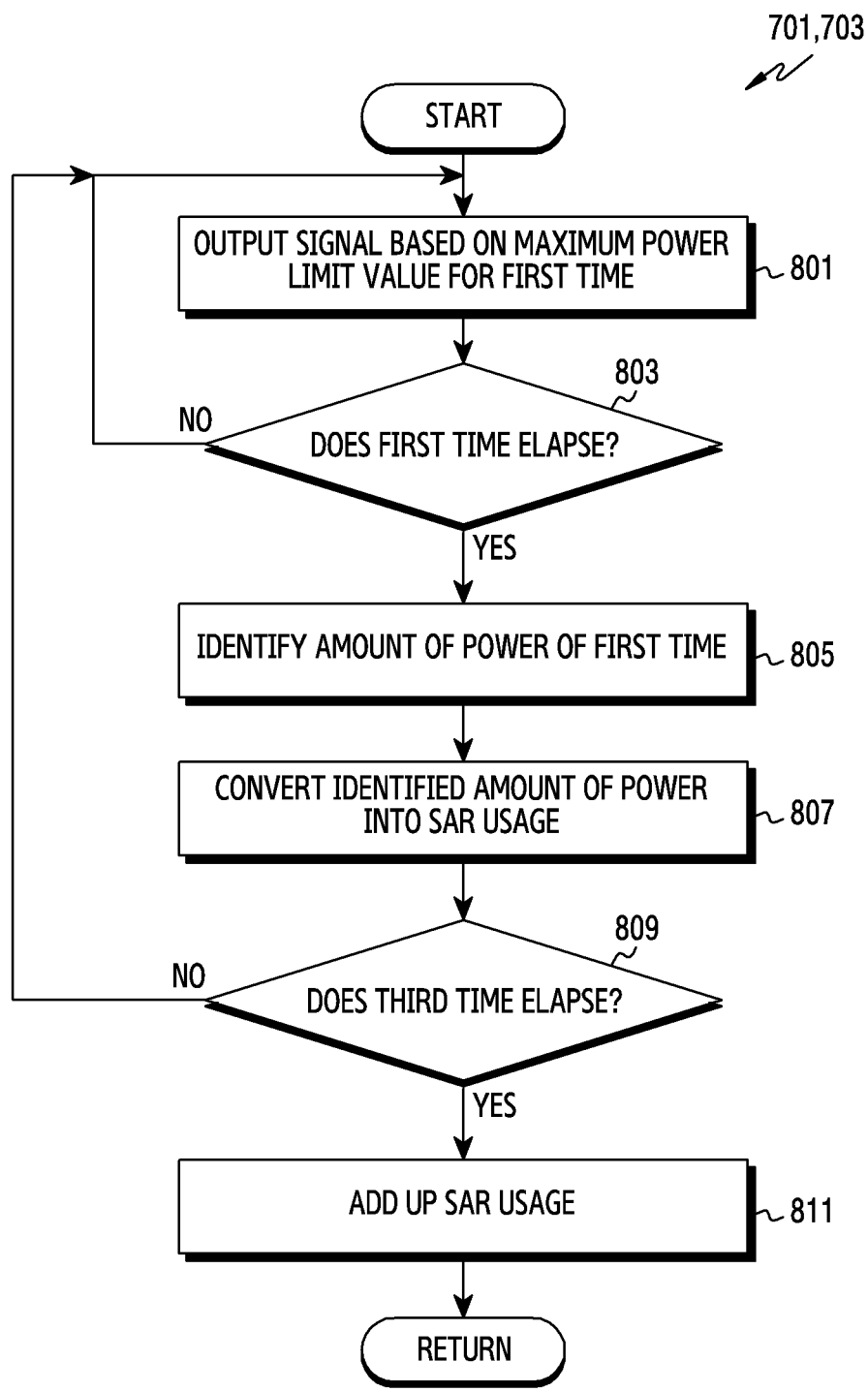
FIG. 8 is a flowchart illustrating an operation of an electronic device according to various embodiments.

FIG. 8 is a flowchart illustrating an operation of an electronic device according to various embodiments. The electronic device may be the electronic device 101 of FIG. 1. The electronic device 101 may include the processor 320 of FIG. 4

Referring to FIG. 8, in operation 801, the electronic device 101 (for example, the processor 320) may output a signal based on a maximum power limit value for an initial first time of an averaging interval. The first time may be an interval period. The first time may be an initial interval period of the averaging interval. The maximum power limit value may be maximum power that can be outputted by the electronic device 101. The maximum power limit value may be an initial value of the maximum power limit value that can be outputted by the electronic device 101, and may be a predetermined value.

In operation 803, the processor 320 may identify whether the first time elapses. The first time may be set to include an interval period. The first time may be 1 ms, 447 µs, 200 µs, or a multiple thereof.

In operation 805, the processor 320 may identify an amount of power (for example, a first amount of power) of a signal (for example, a first output signal) transmitted through the antenna for the first time. The amount of power may be power of the signal outputted from the antenna of the electronic device 101. The amount of power may be an intensity of power of an amplified signal of the amplifier 313, which is connected with the antenna to amplify a signal outputted from the transmitter 311 in the communication module 310 of the electronic device 101. The amount of power may be measured by a circuit connected with the transmitter 311 or the amplifier 313 to measure an intensity of signal power, or by the detector 315. The power of the output signal may be measured every time a signal is outputted. The power of the output signal may be calculated as a sum of power measured for every time (a second time, etc.), for example, every 1 ms.

In operation 807, the processor 320 may convert the amount of power identified for the first time into SAR usage (for example, a first electromagnetic wave absorption rate). The processor 320 may use a variety of information stored in the memory 330 to convert the amount of power into an SAR value. The processor 320 may generate an SAR value corresponding to the measured amount of power of the electronic device 101, based on an algorithm stored in the memory 330.

In operation 809, the processor 320 may identify whether a third time of the averaging interval elapses. The third time, which is the averaging interval, may include a plurality of interval periods (for example, including the first time and the second time). When the third time of the averaging interval elapses, the processor 320 may add up the SAR usage of the respective interval periods (for example, including the first time and the second time), and may calculate total SAR usage of the averaging interval in operation 811. For example, the third time may correspond to six minutes.

Figure 9:
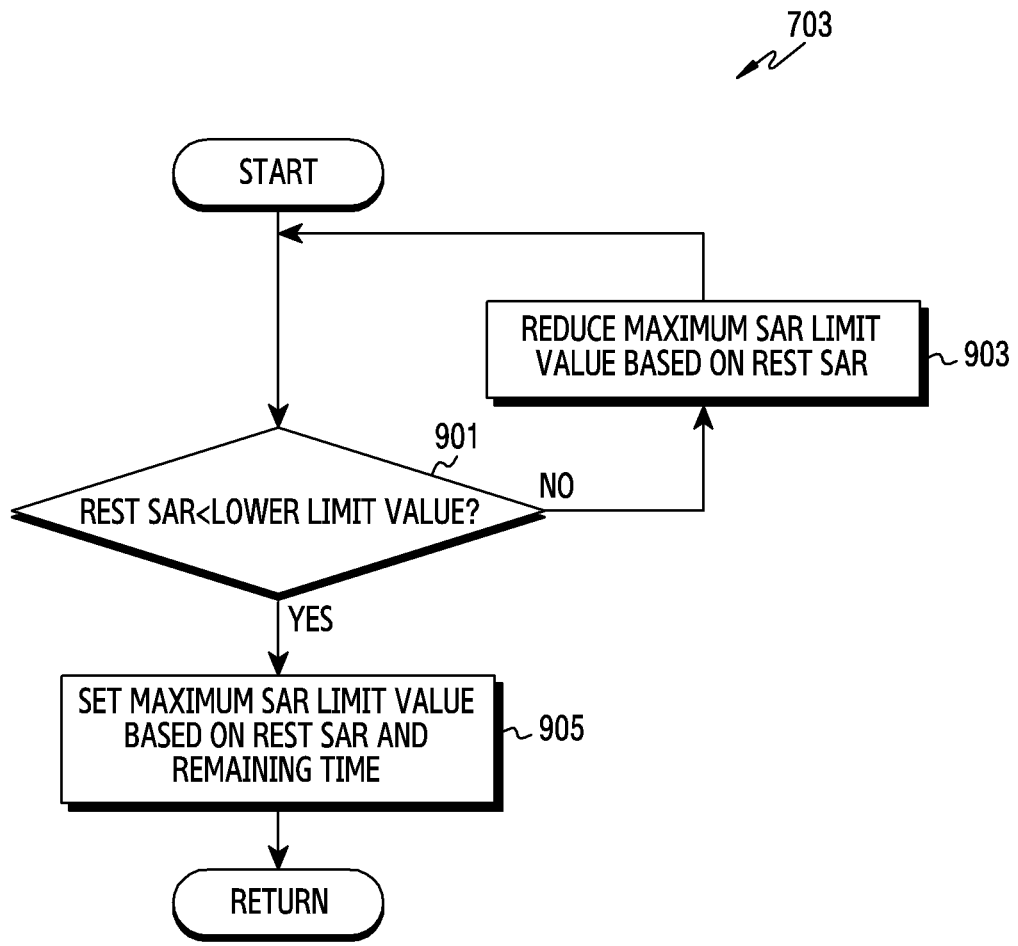
FIG. 9 is a flowchart illustrating an operation of an electronic device according to various embodiments.

FIG. 9 is a flowchart illustrating an operation of an electronic device according to various embodiments. The electronic device may be the electronic device 101 of FIG. 1. The electronic device 101 may include the processor 320 of FIG. 4.

Referring to FIG. 9, in operation 901, the electronic device 101 (for example, the processor 320) may determine whether a rest SAR value is less than or equal to a lower limit value. The rest SAR value may be a value which is the total SAR value (for example, the SAR quota) that can be used in the interval period minus SAR usage in the corresponding interval period. The SAR usage in the corresponding interval period may be an SAR value corresponding to a cumulative value of amounts of power of signals outputted from the respective interval periods. The rest SAR value may be a value which is a total SAR quota set for the corresponding interval period minus the calculated SAR usage. The lower limit value may be a value which is pre-set by considering various characteristics of the electronic device 101. The lower limit value may be set to a value which is proportional to an SAR average value assigned to the corresponding interval period, or a value which is proportional to the SAR quota assigned to the corresponding interval period. The lower limit value may be 1% of the SAR average value or the total SAR quota set for the corresponding interval period.

When the rest SAR value is not less than or equal to the lower limit value (for example, 1%) as a result of determining in operation 901, the processor 320 may reduce a maximum SAR limit value based on the rest SAR in operation 903. For example, when the rest SAR value is 90% or more of the total SAR quota, the maximum SAR limit value may be refined, updated, or reset by reducing an original maximum SAR limit value by 1 dB. For example, when the rest SAR value is 80% of the total SAR quota, the maximum SAR limit value may be refined, updated, or reset by reducing the original SAR limit value by 2 dB. The refined maximum SAR limit value may be proportional to the rest SAR value. A reduction rate of the updated maximum SAR limit value may be determined by considering a ratio of the SAR quota, and total time of a remaining interval period of the corresponding averaging interval or a remaining time.

When the rest SAR value is less than or equal to the lower limit value as a result of determining in operation 901, the processor 320 may refine or set the maximum SAR limit value based on the rest SAR value or the remaining time. In order to prevent signal transmission from being disabled at a certain point time of the remaining period of the corresponding averaging interval since the rest SAR is less than or equal to the lower limit value (for example, 1%), and to guarantee at least signal transmission, the processor 320 may obtain an average by dividing the rest SAR value by the remaining period, and may set the average to the maximum SAR limit value for the remaining period. A maximum power limit value for the remaining period of the averaging interval may be the same as the set maximum SAR limit value.

Figure 10:
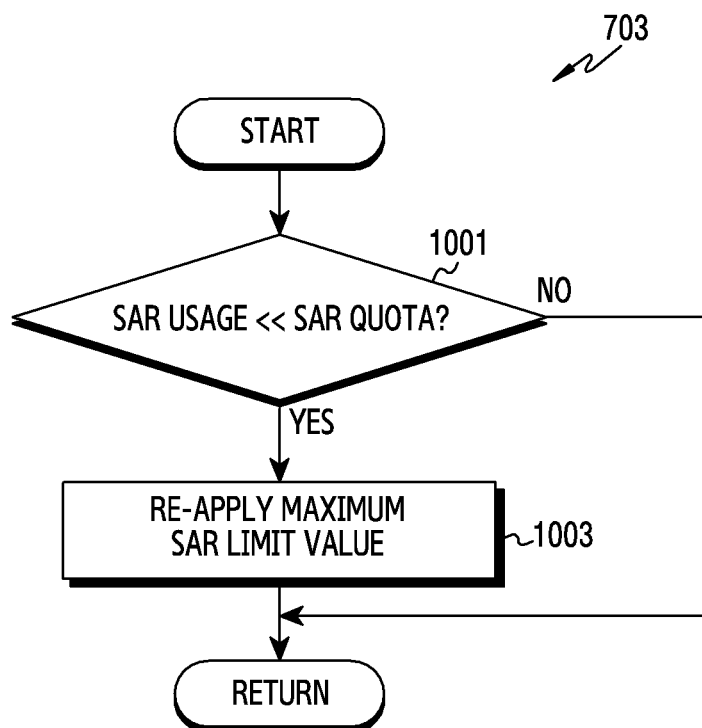
FIG. 10 is a flowchart illustrating an operation of an electronic device according to various embodiments.

FIG. 10 is a flowchart illustrating an operation of an electronic device according to various embodiments. The electronic device may be the electronic device 101 of FIG. 1. The electronic device 101 may include the processor 320 of FIG. 4.

Referring to FIG. 10, in operation 1001, the processor 320 may compare SAR usage for an interval period and an SAR quota for the corresponding interval period, and may determine whether a considerable amount of the SAR quota is not used and remains. Herein, the considerable amount not being used may mean that an amount greater than or equal to a threshold of the SAR quota is not consumed as SAR usage. For example, the processor 320 may identify whether 90% or more of the SAR quota is not consumed as SAR usage that corresponds to a considerably amount of the SAR quote not used (SAR Usage<<SAR Quota). The processor 320 may calculate the SAR usage corresponding to an amount of transmission signal power for the corresponding interval period, and may compare the corresponding SAR usage and the SAR quota for the corresponding interval period.

When the considerable amount of the SAR quota for the corresponding interval period is not consumed (SAR Usage<<SAR Quota), that is, when a difference between the SAR quota and the SAR usage is greater than a predetermined value, the processor 320 may adjust a maximum SAR limit value to be applied to output power of a signal to be outputted next, or a corresponding maximum power limit value in operation 1003. For example, the processor 320 may set the maximum SAR limit value or the maximum power limit value to an initial maximum SAR limit value or an initial maximum power limit value. When the considerable amount of the SAR quota for the corresponding interval period is not consumed, the processor 320 may control output power of the signal to be outputted next based on the maximum SAR limit value or the corresponding maximum power limit value. For example, the processor 320 may set the maximum SAR limit value or the corresponding maximum power limit value to a maximum value that can be set at the present time. When 90% or more of the SAR quota is not consumed as SAR usage, that is, when the difference between the SAR quota and the SAR usage is greater than a value corresponding to 90% of the SAR quota, the processor 320 may initialize the maximum SAR limit value or refine to a maximum possible value.

When a signal that consumes less power like Volte voice data is transmitted for an interval period, an amount of power actually used in the corresponding interval period may be very small. When power consumption is considerably small, SAR usage may be very small in the corresponding interval period and a maximum power limit value for transmitting the voice data signal such as Volte may be increased as high as possible. Therefore, the voice signal may be transmitted by the maximum power.

Figure 11:
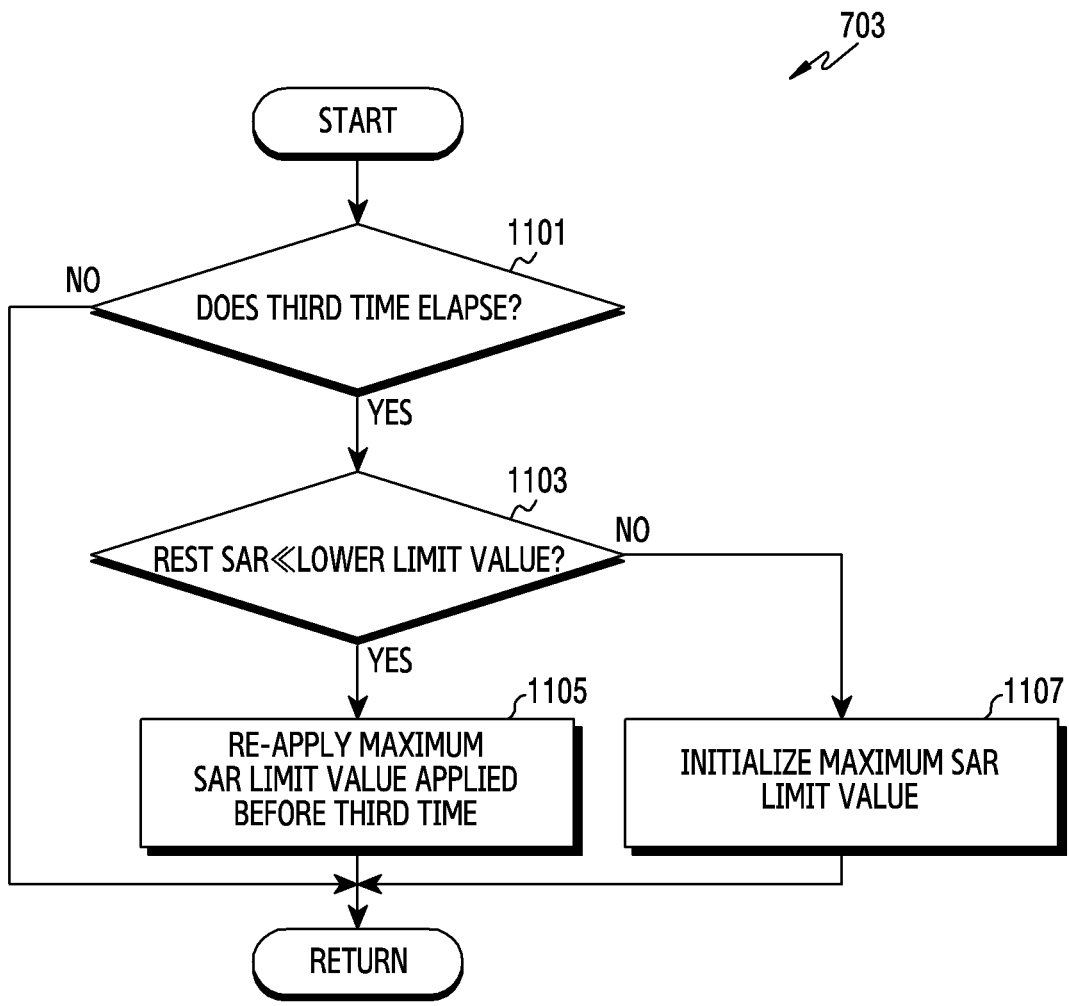
FIG. 11 is a flowchart illustrating an operation of an electronic device according to various embodiments.

FIG. 11 is a flowchart illustrating an operation of an electronic device according to various embodiments. The electronic device may be the electronic device 101 of FIG. 1. The electronic device 101 may include the processor 320 of FIG. 4.

Referring to FIG. 11, in operation 1101, the electronic device 101 (for example, the processor 320) may identify whether a predetermined time elapses. The predetermined time may be a third time corresponding to a length of an averaging interval. For example, when the third time including a first time and a second time elapses, the processor may identify an SAR value.

When the predetermined time elapses, the processor 320 may identify whether a rest SAR value of the corresponding averaging interval is less than a lower limit value in operation 1103. The lower limit value may be a value which is pre-set by considering various characteristics of the electronic device 101. The lower limit value may be set to a value which is proportional to an SAR average value set for the corresponding averaging interval or a value which is proportional to a total SAR quota assigned to the corresponding averaging interval. The lower limit value may be 5% of the SAR average value or the total SAR quota set for the corresponding averaging interval. When the rest SAR value is less than the lower limit value, the processor 320 may perform operation 1105. On the other hand, when the rest SAR value is greater than or equal to the lower limit value, the processor 320 may perform operation 1107.

When the rest SAR value is less than the lower limit value, the processor 320 may apply a maximum SAR limit value or a maximum power limit value, which was applied until the third time corresponding to a holding time of the corresponding averaging interval, to a next averaging interval after the third time in operation 1105. The maximum SAR limit value or the maximum power limit value initially applied to the next averaging interval after the third time may be restored to the maximum SAR limit value or the maximum power limit value applied before at least the third time. An initial signal output of the next averaging interval after the third time may be restored to the maximum SAR limit value or the maximum power limit value applied before the third time.

When the rest SAR value is greater than or equal to the lower limit value, the processor 320 may apply the initial maximum SAR limit value or the corresponding maximum power limit value to the next averaging interval in operation 1107. The initial maximum SAR limit value or the corresponding maximum power limit value may be a maximum output value that can be outputted by the electronic device 101. When the total SAR usage is small in comparison to the SAR value assigned to the previous averaging interval, and thus the rest SAR value is greater than or equal to a predetermined value, the maximum power limit value applied to an initial interval period of the averaging interval may be initialized to a maximum power value that can be applied by the electronic device 101, such that signal transmission power can be efficiently used.

Figure 12:
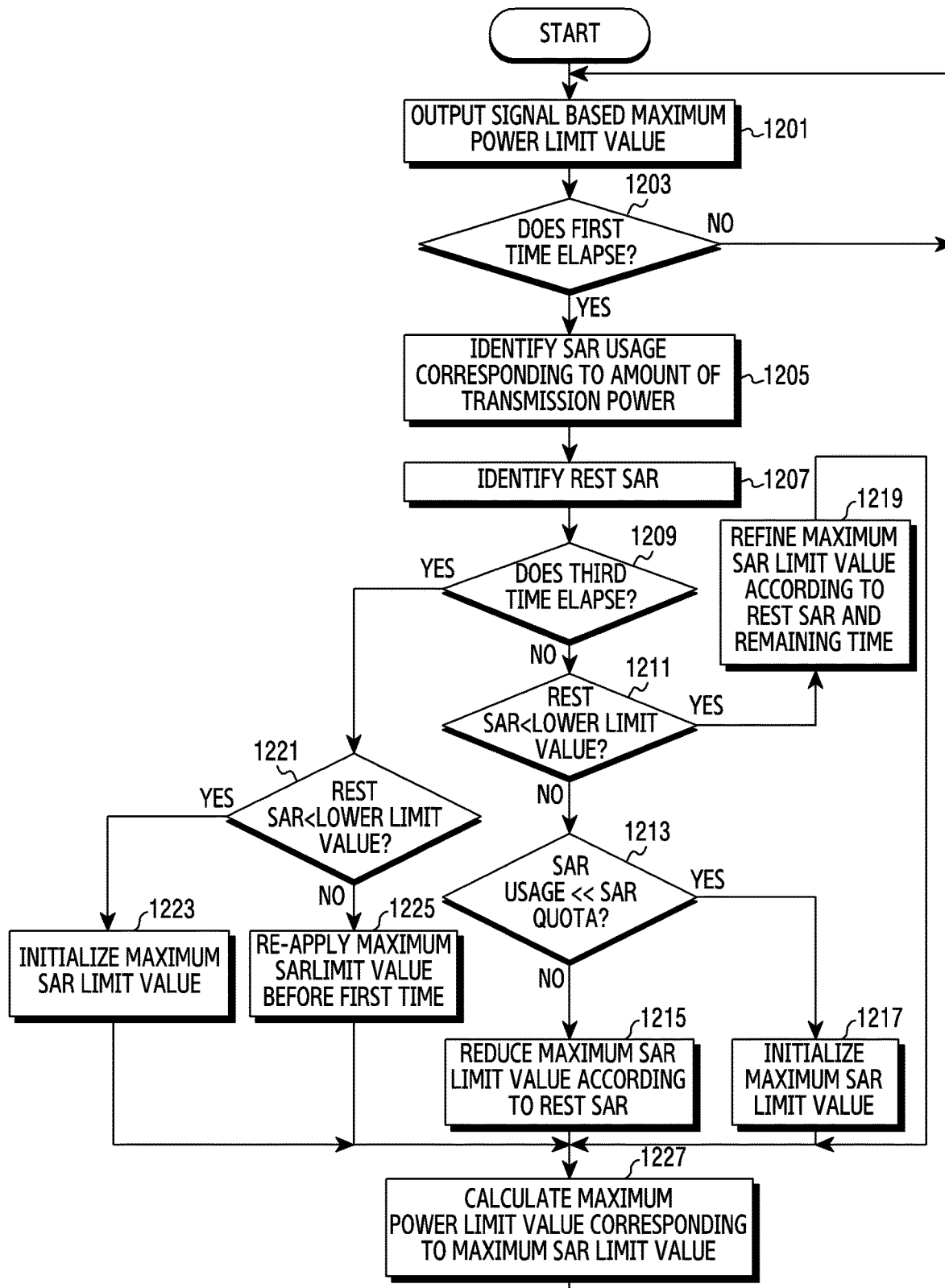
FIG. 12 is a flowchart illustrating an operation of an electronic device according to various embodiments.

FIG. 12 is a flowchart illustrating an operation of an electronic device according to various embodiments. The electronic device may be the electronic device 101 of FIG. 1. The electronic device 101 may include the processor 320 of FIG. 4.

Referring to FIG. 12, in operation 1201, the electronic device 101 (for example, the processor 320) may output a signal based on an initial maximum power limit value. The initial maximum power limit value may be a maximum power value that can be applied in the electronic device 101 according to SAR rules.

In operation 1203, the processor 320 may identify whether a specific time (first time or second time) corresponding to an interval period elapses. When the specific time elapses, the processor 320 may identify an amount of transmission power of the electronic device 101 for the specific time and may identify SAR usage corresponding thereto in operation 1205. The processor 320 may calculate a rest SAR value by subtracting the SAR usage from a SAR quota assigned to the corresponding interval period in operation 1207. The processor 320 may also calculate an SAR quota assigned to each interval period, based on the SAR quota and/or the maximum power limit value for the averaging interval.

In operation 1209, the processor 320 may identify whether a third time corresponding to the averaging interval elapses.

When the averaging interval (for example, the third time) does not elapse, the processor 320 may identify whether the rest SAR value which is available in the corresponding averaging interval is less than or equal to a predetermined lower limit value (for example, 1%) in operation 1211.

When the rest SAR value available in the corresponding averaging interval is not less than or equal to the lower limit value, the processor 320 may identify whether a considerable amount of the SAR quota is not used and remains by comparing the SAR usage in the corresponding interval period and the SAR quota for the corresponding interval period in operation 1213. The processor 320 may identify whether 90% or more of the SAR quota is not consumed as SAR usage. The processor 320 may calculate the SAR usage corresponding to the amount of transmission signal power for the corresponding interval period, and may compare the SAR usage with the SAR quota of the corresponding interval period.

When a predetermined amount of the SAR quota for the corresponding interval period is consumed, the processor 320 may reduce the maximum SAR limit value based on the rest SAR in operation 1215. For example, when the rest SAR is 90% or less of the total SAR quota, the processor 320 may reduce the original maximum SAR limit value by 1 dB and may set the reduced maximum SAR limit value for the next interval period. When the rest SAR is 80% or less of the total SAR quota, the processor 320 may reduce the original maximum SAR limit value by 2 dB, and may set the reduced maximum SAR limit value for the next interval period.

When the SAR quota is not consumed in the corresponding interval period and a considerable amount of the SAR quota remains, the processor 320 may initialize the maximum SAR limit value or the corresponding maximum power limit value to be applied to output power of a signal to be outputted in the next interval period to the initial maximum SAR limit value or the initial maximum power limit value applied in the corresponding averaging interval in operation 1217.

When the rest SAR value available in the corresponding averaging interval is less than or equal to the predetermined lower limit value as a result of determining in operation 1211, the processor 320 may set the maximum SAR limit value based on the rest SAR and a remaining time in operation 1219. The processor 320 may calculate an average by dividing the rest SAR by the remaining period, and may set the average to the maximum SAR limit value during the remaining period. The maximum power limit value for the remaining period of the corresponding averaging interval may correspond to the set maximum SAR limit value, and may be equally applied to the total remaining time.

When the third time corresponding to the averaging interval elapses in operation 1209, the processor 320 may identify whether the rest SAR value of the corresponding averaging interval is less than or equal to a lower limit value (for example, 5%) in operation 1221.

When the rest SAR value is less than or equal to the lower limit value, the processor 320 may apply the maximum SAR limit value or the maximum power limit value applied until the third time corresponding to a holding time of the corresponding averaging interval to the next averaging interval corresponding a time after the third time in operation 1223.

When the rest SAR value is greater than or equal to the lower limit value, the processor 320 may initialize the maximum SAR limit value or the corresponding maximum power limit value, and may apply the initialized maximum SAR limit value or maximum power limit value to the next averaging interval in operation 1225. The initial maximum SAR limit value or the corresponding maximum power limit value may be a maximum power value that can be outputted by the electronic device 101 in the averaging interval.

In operation 1227, the processor 320 may calculate a maximum power limit value corresponding to the initialized, re-applied, or updated maximum SAR limit value, and may apply the maximum power limit value to the next interval period.

The electronic device 101 may include: an antenna; a communication circuit connected with the antenna; and a processor. The processor may be configured to: identify a first amount of power corresponding to a first output signal outputted through the antenna for a first time by using the communication circuit, the operation of identifying the first amount of power including an operation of identifying a first electromagnetic wave absorption rate corresponding to the first amount of power; identify a second amount of power corresponding to a second output signal outputted through the antenna for a second time after the first time by using the communication circuit, the operation of identifying the second amount of power including an operation of identifying a second electromagnetic wave absorption rate corresponding to the second amount of power; determine a maximum output power for a third output signal to be outputted through the antenna according to a difference between a target electromagnetic wave absorption rate and the second electromagnetic absorption rate; and output the third output signal through the antenna based at least one the maximum output power.

When the difference between the target electromagnetic wave absorption rate regarding the second time and the second electromagnetic wave absorption rate is greater than a specified value, the processor may be configured to determine a maximum output power for the first output signal as the maximum output power for the third signal.

When the difference between the target electromagnetic wave absorption rate regarding the second time and the second electromagnetic wave absorption rate is greater than a specified value, the processor may be configured to determine a maximum output power for the second output signal as the maximum output power for the third output signal. The processor may be configured to maintain the maximum output power for the third output signal for a third time after the second time. The processor may be configured to set the second time and the third time as having the same length.

When the difference between the target electromagnetic wave absorption rate regarding the second time and the second electromagnetic wave absorption rate is smaller than a specified value, the processor may be configured determine a value which is obtained by reducing a maximum output power for the second output signal by a predetermined second value, as the maximum output power for the third output signal.

The processor may be configured to add up the first electromagnetic wave absorption rate corresponding to the first amount of power identified for the first time, and the second electromagnetic wave absorption rate corresponding to the second amount of power identified for the second time, to compare the added-up value with the target electromagnetic wave absorption rate, and to determine the maximum output power for the third output signal based on the result of comparison.

The processor may be configured to total up electromagnetic wave absorption rates including the first electromagnetic wave absorption rate and the second electromagnetic wave absorption rate which are identified for a third time including the first time and the second time, and, when a difference between the total of the electromagnetic wave absorption rates and a total of target electromagnetic wave absorption rates is smaller than a specified lower limit value, the processor may be configured to determine, as the maximum output power for the third output signal, an average value which is obtained by dividing the total of the target electromagnetic wave absorption rates minus the total of the electromagnetic wave absorption rates by a remaining time of the third time.

When the third time including the first time and the second time elapses, the processor may be configured to total up electromagnetic wave absorption rates including the first electromagnetic wave absorption rate and the second electromagnetic wave absorption rate which are identified for the third time, and, when a difference between the total of the electromagnetic wave absorption rates and a total of the target electromagnetic wave absorption rates is smaller than a specified lower limit value, the processor may be configured to determine a maximum output power set at an initial point of time of the third time as the maximum output power for the third output signal outputted after the third time.

When the third time including the first time and the second time elapses, the processor may be configured to total up electromagnetic wave absorption rates including the first electromagnetic wave absorption rate and the second electromagnetic wave absorption rate which are identified for the third time, and, when a difference between the total of the electromagnetic wave absorption rates and a total of the target electromagnetic wave absorption rates is greater than a specified lower limit value, the processor may be configured to determine an initial maximum output power pre-set for the antenna as the maximum output power for the third output signal outputted after the third time.

The electronic device 101 may include a communication module and a processor.

The processor may be configured to: identify a first amount of power corresponding to a first output signal outputted from the communication module based on a first maximum power limit value corresponding to an electromagnetic wave absorption rate assigned for a first time, and to identify a first electromagnetic wave absorption rate corresponding to the first amount of power; determine a second maximum power limit value for a second output signal to be outputted through the communication module for a second time after the first time, based on a difference between the electromagnetic wave absorption rate assigned for the first time and the first electromagnetic wave absorption rate; and to output the second output signal through the communication module, based at least on the second maximum power limit value.

When the difference between the electromagnetic wave absorption rate assigned for the first time and the first electromagnetic wave absorption rate is greater than a predetermined value, the processor may be configured to determine the second maximum power limit value based on a predetermined initial maximum power limit value for the communication module.

When the difference between the electromagnetic wave absorption rate assigned for the first time and the first electromagnetic wave absorption rate is greater than a predetermined value, the processor may be configured to determine the second maximum power limit value the same as the first maximum power limit value.

The processor may be configured to maintain the second maximum power limit value for the second time after the first time. The processor may be configured to set the first time and the second time as having the same length.

When the difference between the electromagnetic wave absorption rate assigned for the first time and the first electromagnetic wave absorption rate is smaller than a predetermined value, the processor may be configured to determine a value which is reduced from the first maximum power limit value by a predetermined second value, as the second maximum power limit value.

The processor may be configured to add up the first electromagnetic wave absorption rates corresponding to the first amounts of power identified every the first time for a predetermined third time, to compare the added-up first electromagnetic wave absorption rates and a total electromagnetic wave absorption rate assigned for the third time, and to determine a third maximum power limit value for a fourth time after the third time based on the result of comparison.

The processor may be configured to identify whether the predetermined third time elapses, and, when the third time does not elapse and a difference between a total of the first electromagnetic wave absorption rates corresponding to the first amounts of power identified for the first time, and a total electromagnetic wave absorption rate assigned for the third time is smaller than a specified lower limit value, the processor is configured to determine an average value obtained by dividing the first maximum power limit values by a remaining time of the third time, as the second maximum power limit value for the remaining time.

The processor may be configured to identify whether the predetermined third time elapses, and, when the third time elapses and a difference between a total of the first electromagnetic wave absorption rates corresponding to the first amounts of power identified for the first time, and a total electromagnetic wave absorption rate assigned for the third time is smaller than a specified lower limit value, the processor may be configured to determine the first maximum power limit value set at an initial point of time of the third time, as the second maximum power limit value.

The processor may be configured to identify whether the predetermined third time elapses, and, when the third time elapses and a difference between a total of the first electromagnetic wave absorption rates corresponding to the first amount of power identified for the first time, and a total electromagnetic wave absorption rate assigned for the third time is greater than a specified lower limit value, the processor is configured to determine an initial maximum power limit value pre-set for the communication module, as the second maximum power limit value.

Figure 13:
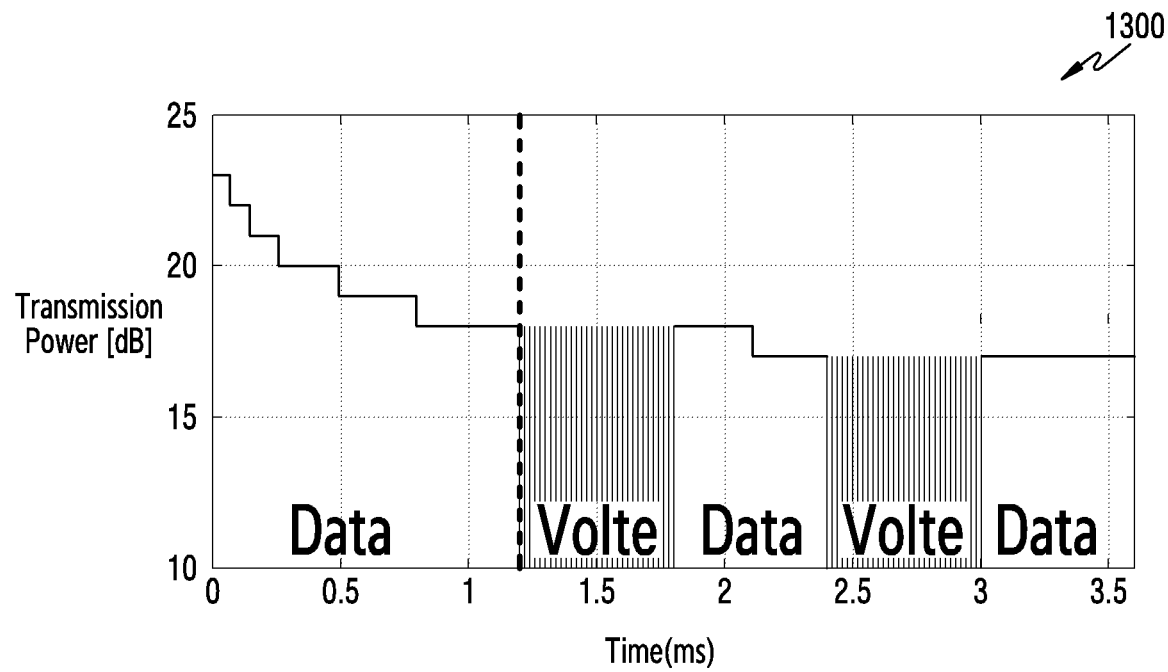
FIG. 13 is a view illustrating an example of transmission power control according to an operation of an electronic device according to various embodiments.
Figure 13:
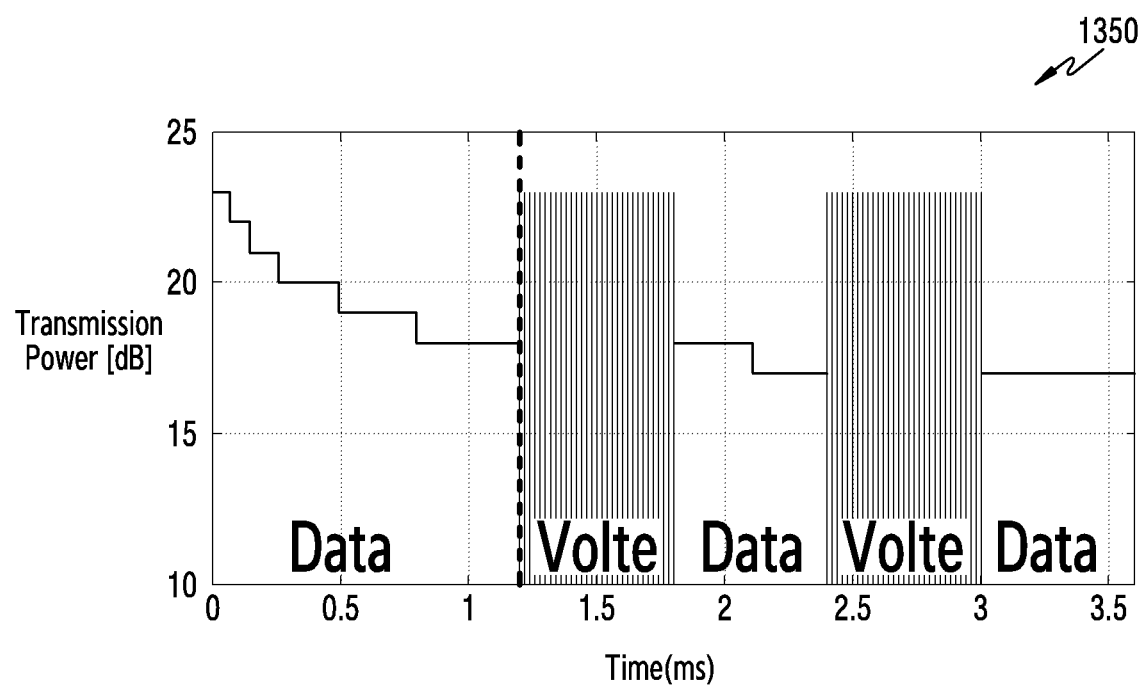

FIG. 13 is a view illustrating an example of control of transmission power according to an operation of an electronic device according to various embodiments.

Referring to FIG. 13, an upper graph 1300 shows an example of related-art time-average power control. The horizontal axis of the upper graph 1300 indicates time and the vertical axis of the upper graph 1300 indicates transmission power. When a large amount of data is used for an initial time of an averaging interval, for example, for 2 minutes, maximum power cannot be used to transmit a Volte voice signal, etc. thereafter until an end point of time of the averaging interval regardless of SAR consumption.

A lower graph 1350 shows an example of time-average power control according to various embodiments. The horizontal axis of the lower graph 1350 indicates time and the vertical axis of the lower graph 1350 indicates transmission power. Even when a large amount of data is used for first two minutes, the electronic device 101 (for example, the processor 320) may restore a maximum power limit value with reference to a micro time if a Volte voice signal, etc. which consume less SAR is outputted next, because SAR usage is smaller than an SAR quota for the micro time of 200 µs, and may increase the power and output the signal. Accordingly, performance of transmission of the signal which uses less SAR, such as Volte voice signal, etc. can be enhanced.

Figure 14:
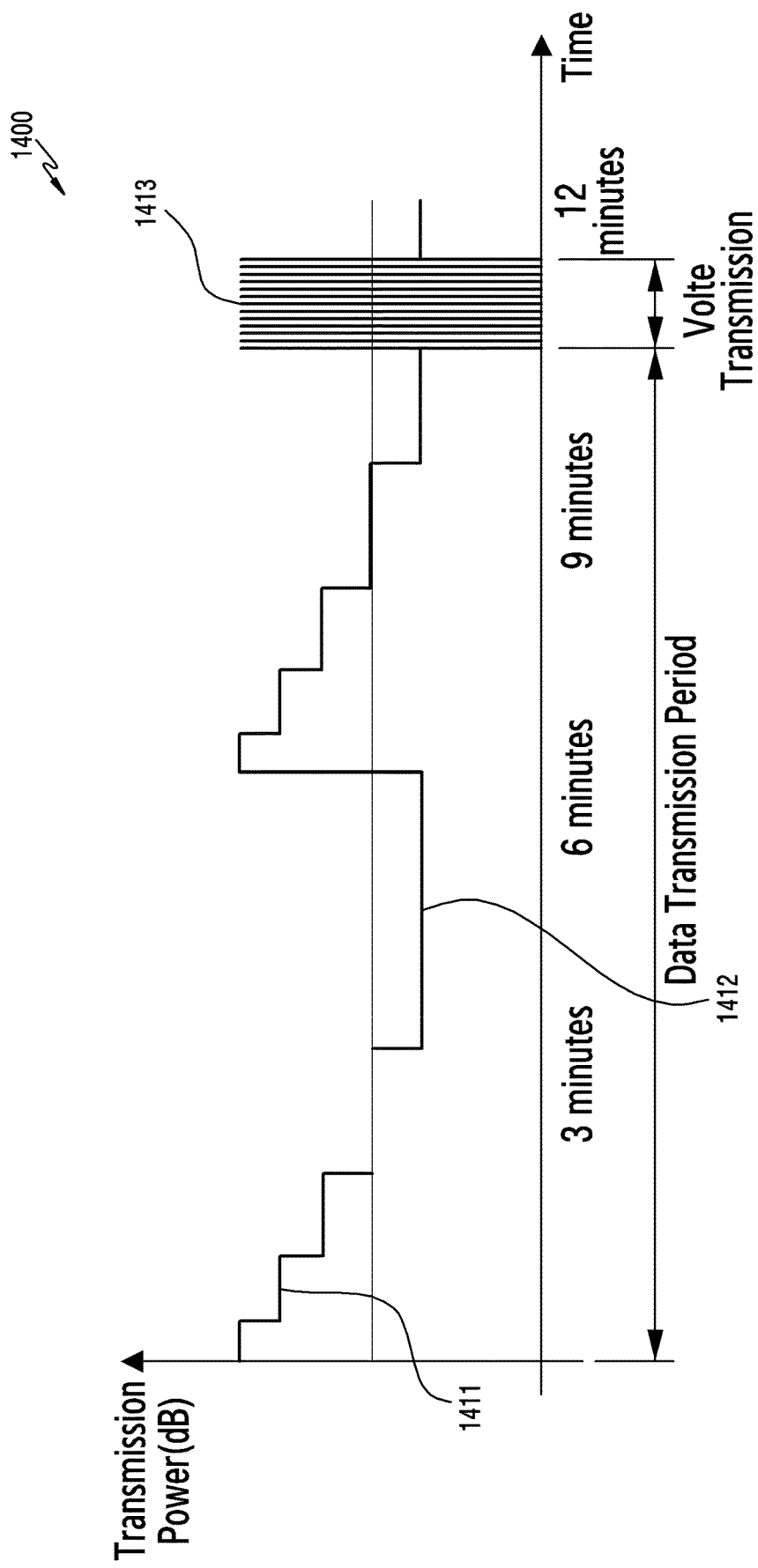
FIG. 14 is a view illustrating an example of transmission power control according to an operation of an electronic device according to various embodiments.

FIG. 14 is a view illustrating an example of control of transmission power according to an operation of an electronic device according to various embodiments.

Referring to FIG. 14, a graph 1400 shows control of transmission power according to an operation of the electronic device 101 according to various embodiments. The horizontal axis of the graph 1400 indicates time and the vertical axis of the graph 1400 indicates transmission power. The electronic device 101 (for example, the processor 320) may compare an SAR amount (SAR quota) usable in the past time of a predetermined time or a micro time (for example, an interval period), and an actually used SAR amount, and, when a considerable amount of the SAR quota is not used, the electronic device 101 may determine that the current SAR usage is not great, and may change a maximum power limit value to an initial value (for example, a Volte period 1413). The processor 320 may maintain the current maximum power limit value until a next comparison time (for example, an end point of the next interval period). The processor 320 may continuously perform the above-described micro time comparison while checking a time-average SAR amount. The processor 101 may continuously check the SAR amount actually used by the electronic device 101 and the SAR amount usable for the micro time, and may continuously increase the maximum power limit value in a scenario in which an amount of transmission of the electronic device 101 is small.

The processor 320 compares the usable SAR amount (SAR quota) and the actually used SAR amount, and, when a considerable amount is used, the processor 320 may reduce the maximum SAR limit value based on a rest SAR. For example, when the rest SAR is 90% or less of a total SAR quota, the processor 320 may reduce the original maximum SAR limit value by 1 dB for the next interval period, and may set the reduced value to the maximum SAR limit value (period 1411).

When a considerable amount of power is used initially (period 1411) with reference to an averaging interval of six minutes, the usable SAR amount is entirely reduced and consumed over a middle period, and the usable SAR amount may be very small in a late period. In this case, the processor 320 may obtain an average by dividing the usable SAR amount by a remaining time of the corresponding averaging interval, and may apply the same maximum power limit value for the remaining time, such that power does not exceed a prescribed SAR amount (period 1412).

In the present disclosure, expressions "greater than or equal to" or "less than or equal to" are used to determine whether a specific state occurs. However, these are merely expressions for describing an example, and the present disclosure does not exclude expressions "exceed" or "less than." The term "greater than or equal to" may be substituted with the term "exceed," the term "less than or equal to" may be substituted with the term "less than," and the term "greater than or equal to and less than" may be substituted with "exceed and less than or equal to."

The electronic device according to various embodiments may be various types of devices. The electronic device may include at least one of, for example, a portable communication device (for example, a smartphone), a computer device, a portable multimedia device, a portable medical device, a camera, a wearable device, or a home appliance. The electronic device according to an embodiment is not limited to the above-described devices.

It should be appreciated that various embodiments of the present disclosure and the terms used therein are not intended to limit the technological features set forth herein to particular embodiments, and include various changes, equivalents, and/or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and/or B," "A, B, or C," or "at least one of A, B, and/or C" may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly or via another element (e.g., a third element).

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, the module may be implemented in a form of an application-specific integrated circuit (ASIC).

Various embodiments as set forth herein may be implemented as software (e.g., the program 140) including one or more instructions that are stored in a machine-readable storage medium (e.g., internal memory 134 or external memory 138) that is readable by a machine (e.g., a computer). The machine may invoke an instruction stored in the storage medium, and may be operated according to the instruction invoked, and may include an electronic device (e.g., the electronic device 101) according to disclosed embodiments. When the instruction is executed by the processor (e.g., the processor 120), the processor may execute a function corresponding the instruction, with or without using one or more other components under the control of the processor. The instruction may include a code generated by a complier or a code executable by an interpreter. The machine-readable storage medium may be provided in the form of a non-transitory storage medium. Wherein, the term "non-transitory" simply means that the storage medium is a tangible device, and does not include a signal, but this term does not differentiate between where data is semi-permanently stored in the storage medium and where the data is temporarily stored in the storage medium.

According to an embodiment, a method according to various embodiments of the present disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed online via an application store (e.g., Play Store™). If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
   an antenna;
   a communication circuit connected with the antenna; and
   one or more processors,
   wherein the one or more processors are configured to:
   during a first averaging window, the first averaging window comprising a plurality of time intervals including a first time interval, a second time interval following the first time interval, and a third time interval following the second time interval:
     identify a second amount of power corresponding to a second output signal outputted through the antenna for the second time interval using the communication circuit, wherein identifying the second amount of power comprises identifying a second electromagnetic wave absorption rate corresponding to the second amount of power;
     determine a maximum power limit value for the third time interval based on a difference between a target electromagnetic wave absorption rate for the second time interval and the second electromagnetic wave absorption rate for the second time interval, the target electromagnetic wave absorption rate corresponding to a maximum power limit value for the second time interval; and
   output a third output signal through the antenna for the third time interval based at least one the maximum power limit value for the third time interval.

2. The electronic device of claim 1, wherein the one or more processors are further configured to:
   identify a first amount of power corresponding to a first output signal outputted through the antenna for the first time interval preceding the second time interval by using the communication circuit, the operation of identifying the first amount of power comprising an operation of identifying a first electromagnetic wave absorption rate corresponding to the first amount of power; and
   based on the difference between the target electromagnetic wave absorption rate regarding the second time interval and the second electromagnetic wave absorption rate for the second time interval being greater than a specified value, determine a maximum power limit value for the first time interval as the maximum power limit value for the third time interval.

3. The electronic device of claim 1, wherein the one or more processors are further configured to:
   based on the difference between the target electromagnetic wave absorption rate regarding the second time interval and the second electromagnetic wave absorption rate for the second time interval being greater than a specified value, determine the maximum power limit value for the second output signal as the maximum power limit value for the third time interval.

4. The electronic device of claim 1, wherein the one or more processors are further configured to:
   based on the difference between the target electromagnetic wave absorption rate regarding the second time and the second electromagnetic wave absorption rate for the second time interval being smaller than a specified value, determine a power limit value which is reduced from the power limit value for the second time interval by a specific amount, as the maximum power limit value for the third time interval.

5. The electronic device of claim 1, wherein the maximum power limit values for the third time interval is larger than the maximum power limit value for the second time interval.

6. The electronic device of claim 1, wherein the one or more processors are configured to:
identify a first amount of power corresponding to a first output signal outputted through the antenna for a first time interval by using the communication circuit, the operation of identifying the first amount of power comprising an operation of identifying a first electromagnetic wave absorption rate corresponding to the first amount of power;
detect the second time interval elapses,
upon detecting, obtain a sum of the first electromagnetic wave absorption rate for the first time interval and the second electromagnetic wave absorption rate for the second time interval,
determine whether a rest specified absorption rate (SAR) is smaller than a specified lower limit value or not, the rest SAR being a value which is a total SAR value assigned to the first averaging window minus a SAR usage up to the second time interval, and
based on a determination that the rest SAR is smaller than the specified lower limit value, determine, as the maximum power limit value for remaining time intervals in the first averaging window, an average value which is obtained by dividing the rest SAR by a remaining time in the first averaging window, the remaining time corresponds to time for the first averaging window excluding the first time interval and the second time interval.

7. The electronic device of claim 1, wherein the one or more processors are configured to:
identify a first amount of power corresponding to a first output signal outputted through the antenna for the first time interval by using the communication circuit, the operation of identifying the first amount of power comprising an operation of identifying a first electromagnetic wave absorption rate corresponding to the first amount of power;
when the first averaging window elapses, determine whether a rest specified absorption rate (SAR) is smaller than a specified lower limit value or not, the rest SAR being a value which is a total SAR value assigned to the first averaging window minus a SAR usage during the first averaging window;
based on the rest SAR being smaller than the specified lower limit value, determine a maximum power value for the first averaging window as a maximum power limit value for the next averaging window; and
based on the rest SAR being greater than the specified lower limit value, determine a maximum power limit value that can be outputted by the electronic device as the maximum power limit value for the next averaging window.

8. An electronic device comprising:
a communication module; and
one or more processors,
wherein the one or more processors are configured to:
during a first averaging window, the first averaging window comprising a plurality of time intervals including a first time interval, a second time interval following the first time interval, and a third time interval following the second time interval:
identify a first amount of power corresponding to a first output signal outputted from the communication module for the first time interval by identifying a first electromagnetic wave absorption rate corresponding to the first amount of power;
determine a second maximum power limit value for the second time interval, based on a difference between the electromagnetic wave absorption rate for the first time interval and the first electromagnetic wave absorption rate for the first time interval, the electromagnetic wave absorption rate corresponding to a maximum power limit value for the first time interval; and
output a second output signal through the communication module for the second time interval, based at least on the second maximum power limit value.

9. The electronic device of claim 8, wherein, the one or more processors are further configured to:
based on the difference between the electromagnetic wave absorption rate assigned for the first time interval and the first electromagnetic wave absorption rate is greater than a predetermined value, determine the second maximum power limit value.

10. The electronic device of claim 8, wherein, the one or more processors are further configured to:
when the difference between the electromagnetic wave absorption rate for the first time interval and the first electromagnetic wave absorption rate is greater than a predetermined value, determine the second maximum power limit value the same as the first maximum power limit value.

11. The electronic device of claim 9, wherein the one or more processors are configured to maintain the second maximum power limit value for the second time interval after the first time interval.

12. The electronic device of claim 11, wherein the one or more processors are configured to set the first time interval and the second time interval as having a same length.

13. The electronic device of claim 8, wherein, the one or more processors are further configured to:
based on the difference between an electromagnetic wave absorption rate for the first time interval and the first electromagnetic wave absorption rate being smaller than a predetermined value, determine a value which is reduced from the maximum power limit value by a predetermined second value, as the second maximum power limit value.

14. The electronic device of claim 8, wherein the one or more processors are configured to summing first electromagnetic wave absorption rates corresponding to the first amounts of power identified, periodically, wherein a period is the first time interval for the third time interval, thereby resulting in a sum, to compare the sum and a total electromagnetic wave absorption rate assigned for the third time interval, and to determine a third maximum power limit value for a fourth time after the third time interval.

15. The electronic device of claim 8, wherein the one or more processors are configured to identify whether a predetermined third time elapses, and, when the third time does not elapse and a difference between a total of first electromagnetic wave absorption rates corresponding to the first amounts of power identified for the first time interval, and a total electromagnetic wave absorption rate assigned for the third time interval is smaller than a specified lower limit value, the one or more processors are configured to determine an average value obtained by dividing the first maximum power limit values by a remaining time of the third time interval, as the second maximum power limit value for the remaining time.

16. The electronic device of claim 8, wherein the one or more processors are configured to identify whether the third time interval elapses, and, when the third time interval elapses and a difference between a total of first electromagnetic wave absorption rates corresponding to the first amounts of power identified for the first time interval, and a total electromagnetic wave absorption rate assigned for the third time interval is smaller than a specified lower limit value, the one or more processors are configured to determine the first maximum power limit value set at an initial point of time of the third time interval, as the second maximum power limit value.

17. The electronic device of claim 8, wherein the one or more processors are configured to identify whether a predetermined third time elapses, and, when the third time interval elapses and a difference between a total of the first electromagnetic wave absorption rates corresponding to the first amount of power identified for the first time, and a total electromagnetic wave absorption rate assigned for the third time is greater than a specified lower limit value, the one or more processors are configured to determine an initial maximum power limit value pre-set for the communication module, as the second maximum power limit value.

18. A control method of an electronic device, the control method comprising:
 during a first averaging window, the first averaging window comprising a plurality of time intervals including a first time interval, a second time interval following the first time interval, and a third time interval following the second time interval:
 identifying a second amount of power corresponding to a second output signal outputted through an antenna for the second time interval using a communication module, wherein identifying the second amount of power comprises identifying a second electromagnetic wave absorption rate corresponding to the second amount of power;
 determining a maximum power limit value for the third time interval based on a difference between a target electromagnetic wave absorption rate for the second time interval and the second electromagnetic wave absorption rate for the second time interval, the target electromagnetic wave absorption rate corresponding to a maximum power limit value for the second time interval; and
 outputting a third output signal through the antenna for the third time interval based at least on the maximum power limit value for the third time interval.

19. The control method of claim 18, wherein the determining comprises, when the difference between the target electromagnetic wave absorption rate for the second time interval and the second electromagnetic wave absorption rate is greater than a predetermined value, determining the maximum power limit value for the third time interval based on a predetermined initial maximum power limit value for the communication module.

\* \* \* \* \*

UNITED STATES PATENT AND TRADEMARK OFFICE
CERTIFICATE OF CORRECTION

PATENT NO. : 10,652,839 B2
APPLICATION NO. : 16/164896
DATED : May 12, 2020
INVENTOR(S) : Yong-Jun Park et al.

It is certified that error appears in the above-identified patent and that said Letters Patent is hereby corrected as shown below:

On the Title Page

Item (30) should read as follows:
--...Oct. 19, 2017 (KR).................10-2017-0136022...--

In the Claims

Column 30, Claim 1, Line 32 should read as follows:
--...at least on the maximum...--

Signed and Sealed this
Ninth Day of June, 2020

Andrei Iancu
*Director of the United States Patent and Trademark Office*